United States Patent
Fin et al.

(10) Patent No.: US 9,833,104 B2
(45) Date of Patent: Dec. 5, 2017

(54) BREWING DEVICE FOR PREPARING A FOOD PRODUCT

(75) Inventors: Giuseppe Fin, Meolo (IT); Andrea Favero, Quarto D'Altino (IT); Giovanni Berto, Olmi di San Biagio di Callalta (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 214 days.

(21) Appl. No.: 13/816,520

(22) PCT Filed: Jul. 22, 2011

(86) PCT No.: PCT/IB2011/053272
§ 371 (c)(1),
(2), (4) Date: Feb. 12, 2013

(87) PCT Pub. No.: WO2012/020343
PCT Pub. Date: Feb. 16, 2012

(65) Prior Publication Data
US 2013/0142931 A1   Jun. 6, 2013

(30) Foreign Application Priority Data

Aug. 13, 2010 (IT) ................................. FI2010A0178
Dec. 13, 2010 (EP) ..................................... 10194741

(51) Int. Cl.
A47J 31/06 (2006.01)
A47J 31/20 (2006.01)
(Continued)

(52) U.S. Cl.
CPC .......... *A47J 31/407* (2013.01); *A47J 31/3633* (2013.01); *A47J 31/3638* (2013.01)

(58) Field of Classification Search
CPC .............. B65D 85/8043; A47J 31/3695; A47J 31/0642; A47J 31/446; A47J 31/0668;
(Continued)

(56) References Cited

U.S. PATENT DOCUMENTS 5,555,791 A * 9/1996 McNeill et al. ................. 99/295
5,776,527 A * 7/1998 Blanc .............................. 426/77
(Continued)

FOREIGN PATENT DOCUMENTS

EP    1495702 A1    1/2005
EP    1721553 A1    11/2006
(Continued)

*Primary Examiner* — Gyounghyun Bae

(57) ABSTRACT

A brewing device includes a frame that has an insertion area for inserting a capsule towards a brewing position. Further, the brewing device includes a brewing chamber that has a first portion and a second portion. The first and second portions of the brewing chamber are slidingly arranged in a sliding area of the frame. The first portion and the second portion both slide with respect to each other and with respect to the frame between a closed position and an open position. Ducts supply a brewing fluid to the chamber and outlet a brewed product from the brewing chamber. A pair of opposed guiding channels are provided for inserting, from a top of the insertion area, the capsule in the brewing position which is fixed with respect to the frame, and at least one member is provided for supporting the capsule in the brewing position.

24 Claims, 21 Drawing Sheets

(51) Int. Cl.
*A47J 31/40* (2006.01)
*A47J 31/36* (2006.01)

(58) Field of Classification Search
CPC .. A47J 31/3633; A47J 31/3638; A47J 31/407;
A47J 31/002; A23F 5/26; A23F 5/243;
A23F 3/18
USPC ........... 99/295, 275, 279, 289, 289 D, 289 P,
99/290, 294, 297, 299, 300, 301, 302 R,
99/302 P, 307; 426/433
See application file for complete search history.

(56) References Cited

U.S. PATENT DOCUMENTS

| | | | | |
|---|---|---|---|---|
| 7,703,380 | B2* | 4/2010 | Ryser et al. | 99/295 |
| 8,176,840 | B2 | 5/2012 | Jarisch | |
| 8,272,319 | B2 | 9/2012 | Jarisch | |
| 2002/0002913 | A1* | 1/2002 | Mariller et al. | 99/495 |
| 2003/0066431 | A1* | 4/2003 | Fanzutti et al. | 99/279 |
| 2004/0112222 | A1* | 6/2004 | Fischer | A47J 31/3628 99/279 |
| 2005/0034604 | A1* | 2/2005 | Halliday | A47J 31/0673 99/279 |
| 2005/0126400 | A1* | 6/2005 | Bragg et al. | 99/279 |
| 2005/0129809 | A1* | 6/2005 | Cortese | 426/77 |
| 2007/0221066 | A1* | 9/2007 | Sullivan et al. | 99/279 |
| 2008/0006159 | A1* | 1/2008 | Fischer | A47J 31/3685 99/289 R |
| 2008/0115674 | A1* | 5/2008 | Huang et al. | 99/279 |
| 2009/0017177 | A1* | 1/2009 | Yoakim | A47J 31/0678 426/431 |
| 2009/0029021 | A1* | 1/2009 | Nielsen et al. | 426/433 |
| 2009/0117249 | A1* | 5/2009 | Ozanne | A47J 31/3628 426/590 |
| 2009/0155422 | A1* | 6/2009 | Ozanne | A47J 31/0615 426/89 |
| 2009/0205503 | A1* | 8/2009 | Cortese | 99/295 |
| 2009/0205505 | A1* | 8/2009 | Russo | A47J 31/56 99/295 |
| 2009/0220650 | A1* | 9/2009 | Ozanne | B65D 85/8043 426/78 |
| 2009/0293736 | A1* | 12/2009 | Jarisch | A47J 31/3633 99/295 |
| 2009/0308258 | A1* | 12/2009 | Boussemart et al. | 99/295 |
| 2009/0320693 | A1* | 12/2009 | Ozanne | A47J 31/0673 99/295 |
| 2010/0003371 | A1* | 1/2010 | Ozanne | B65D 85/8043 426/77 |
| 2010/0037779 | A1* | 2/2010 | Pecci | A47J 31/3633 99/289 R |
| 2010/0101428 | A1* | 4/2010 | Fin | A47J 31/3638 99/295 |
| 2010/0159108 | A1* | 6/2010 | Blanc et al. | 426/590 |
| 2010/0189859 | A1* | 7/2010 | Blanc et al. | 426/394 |
| 2010/0239734 | A1* | 9/2010 | Yoakim | A47J 31/22 426/433 |
| 2010/0288132 | A1* | 11/2010 | Gavillet | A47J 31/3628 99/295 |
| 2011/0017072 | A1* | 1/2011 | Frigeri | A47J 31/3676 99/289 P |

FOREIGN PATENT DOCUMENTS

| | | |
|---|---|---|
| EP | 2044867 A1 | 4/2009 |
| EP | 2177136 A1 | 4/2010 |
| WO | 2005004683 A1 | 1/2005 |
| WO | 2005058111 A1 | 6/2005 |
| WO | 2006103234 A1 | 10/2006 |
| WO | 2009118269 A1 | 10/2009 |

* cited by examiner

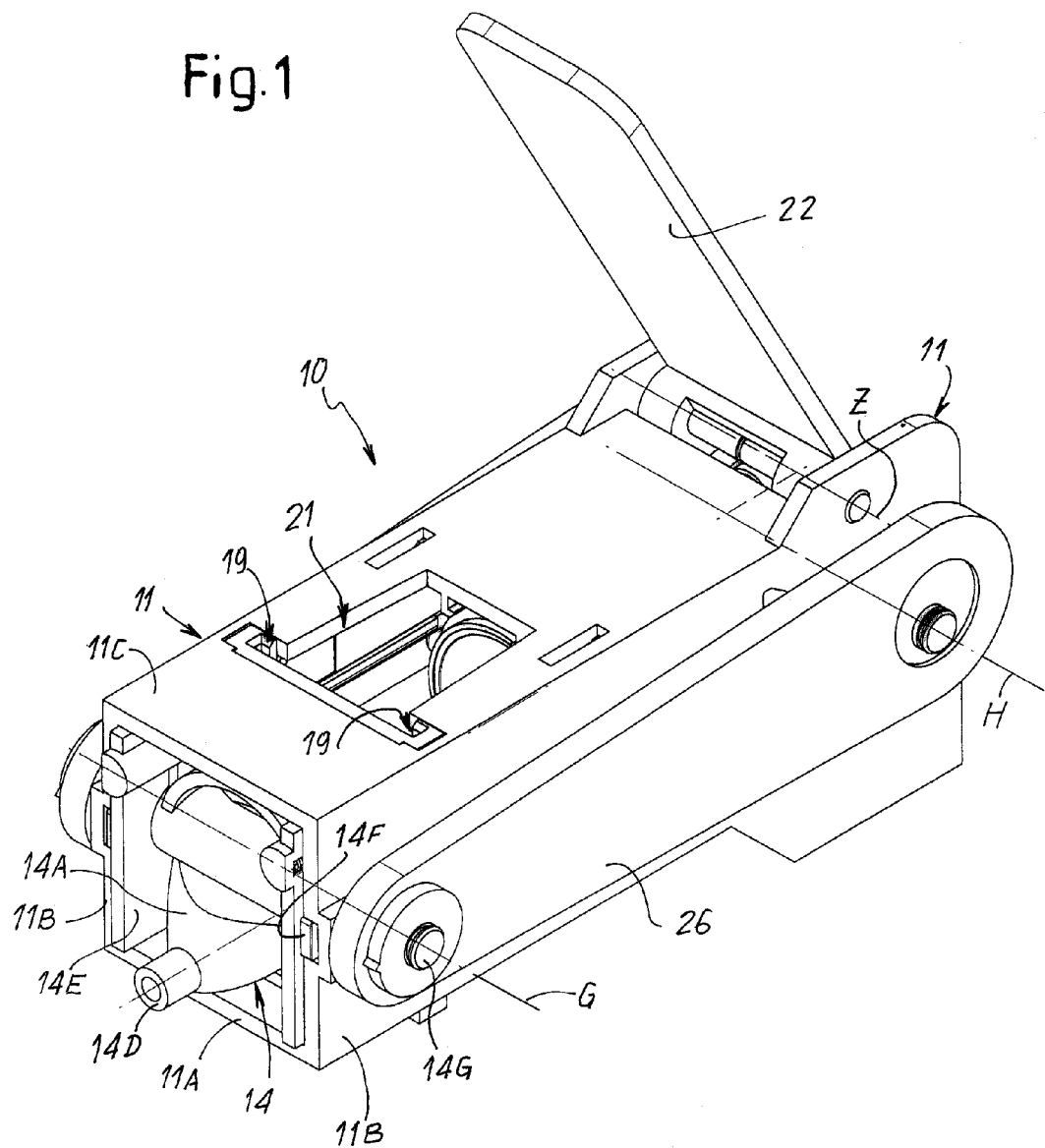

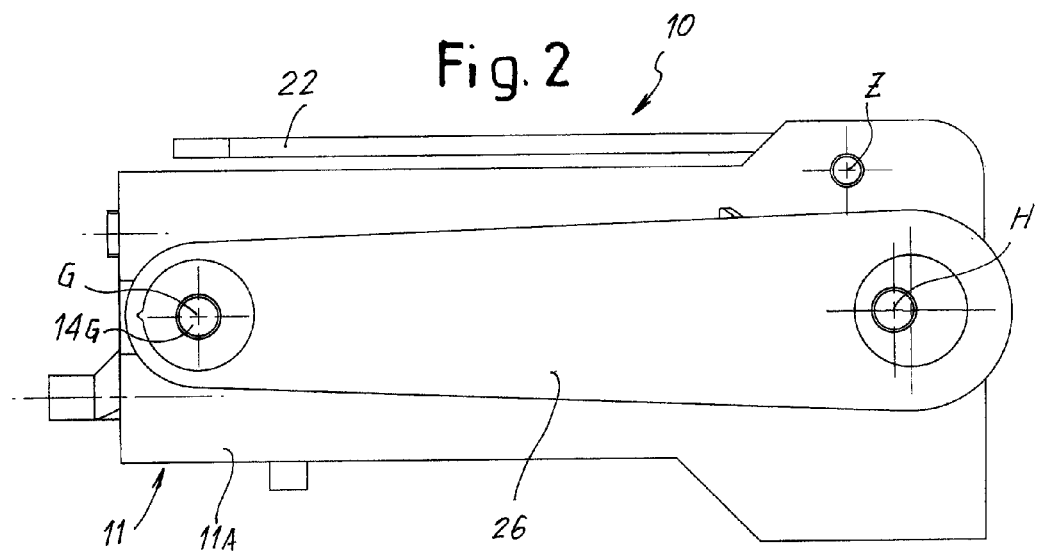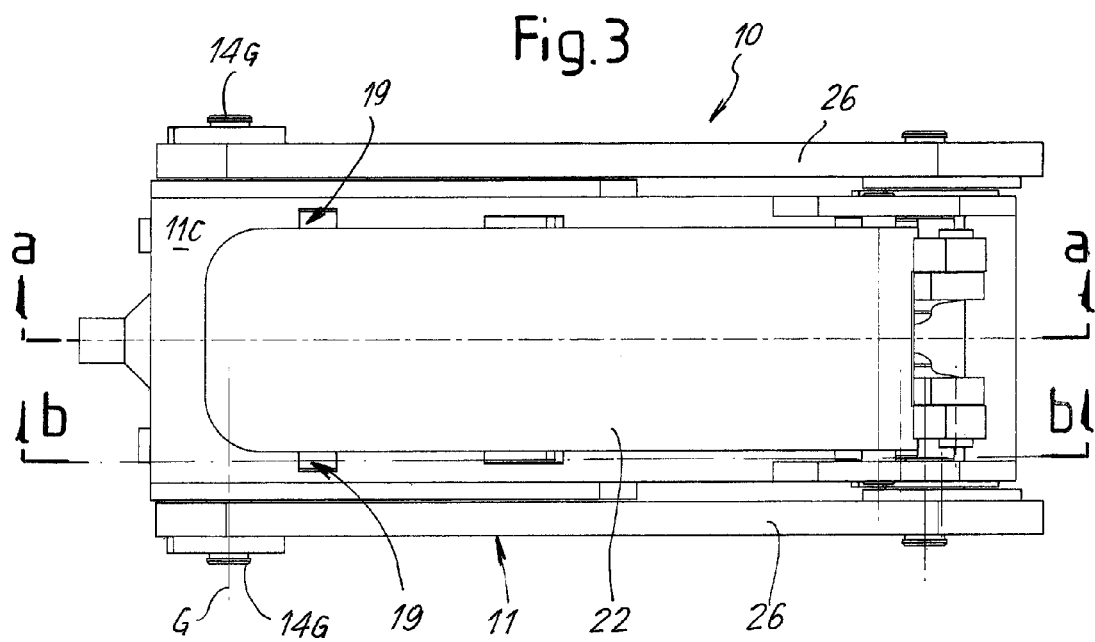

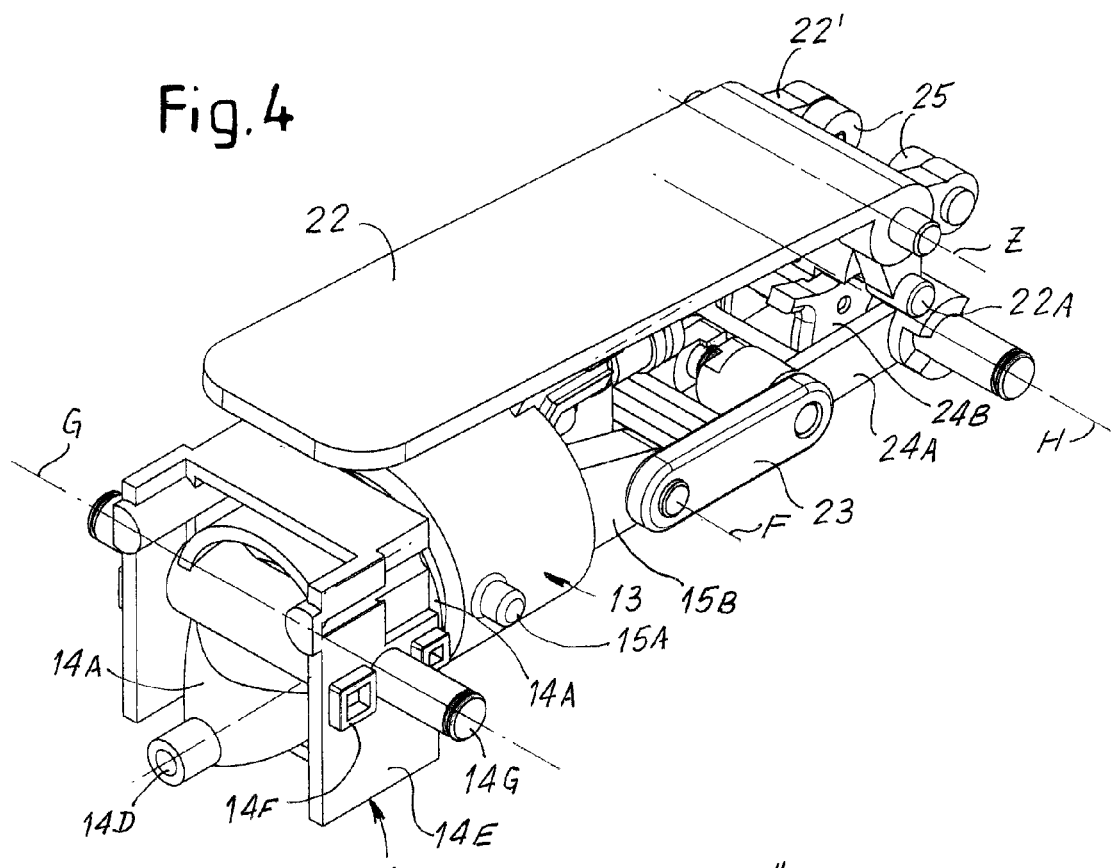
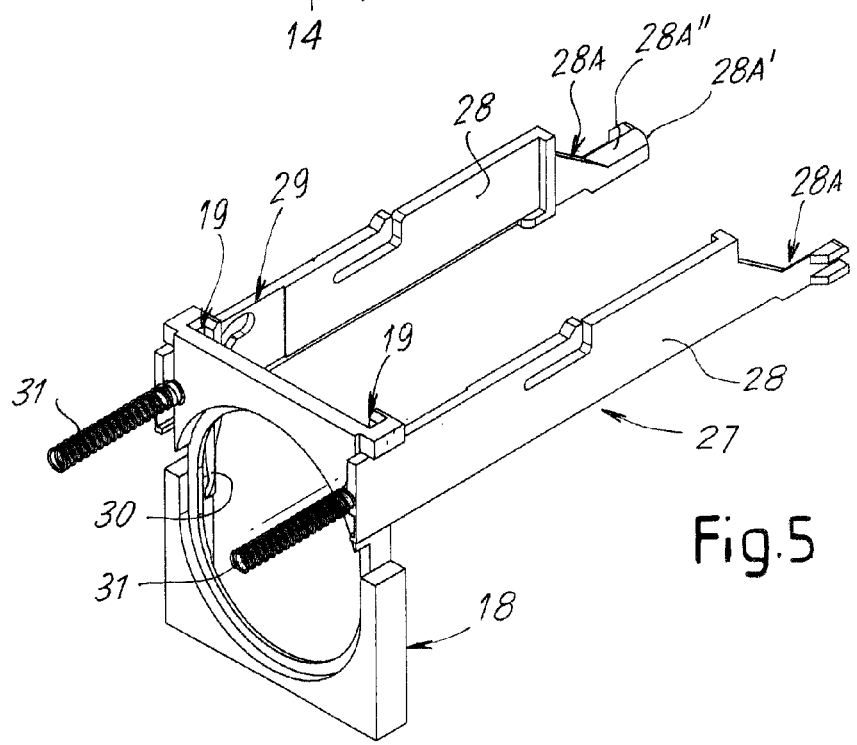

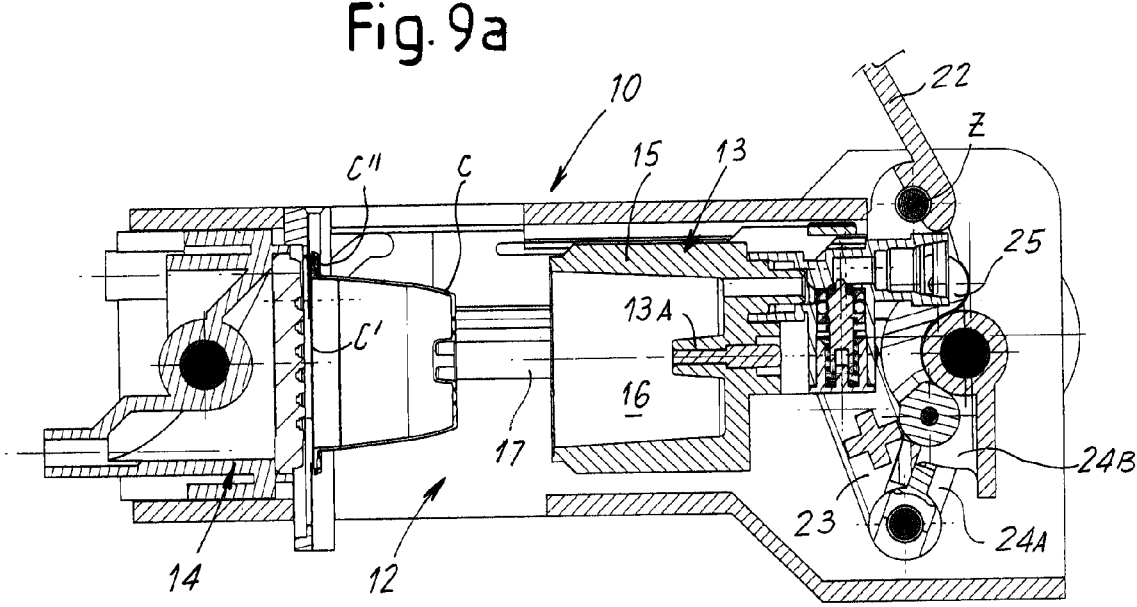
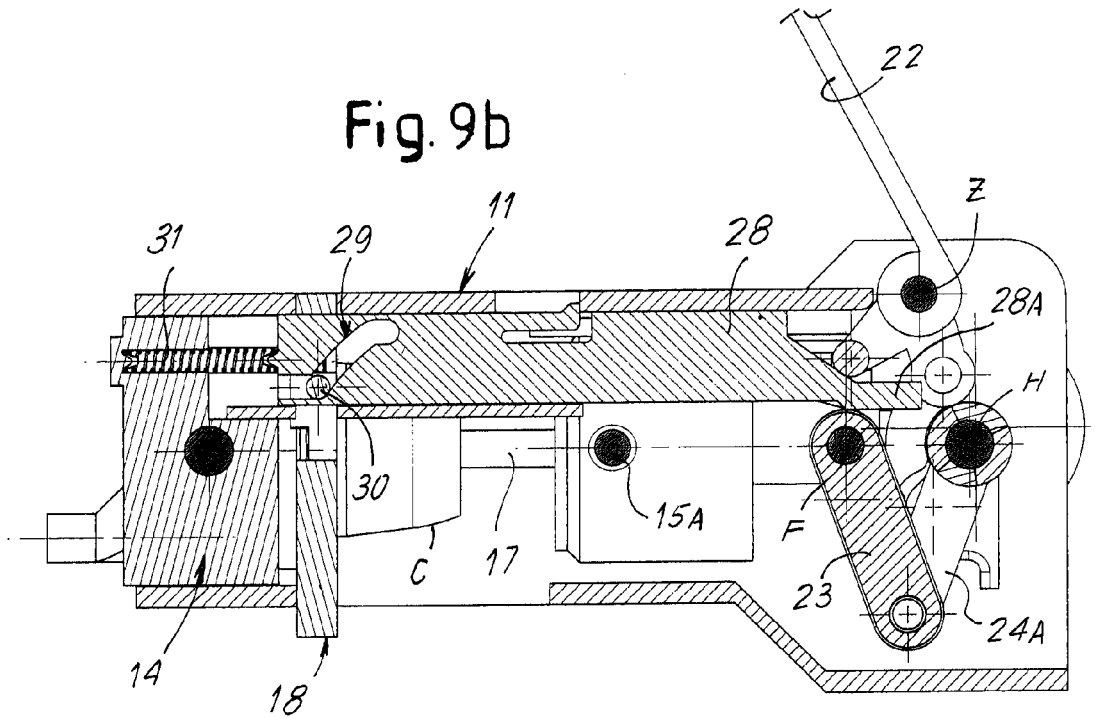

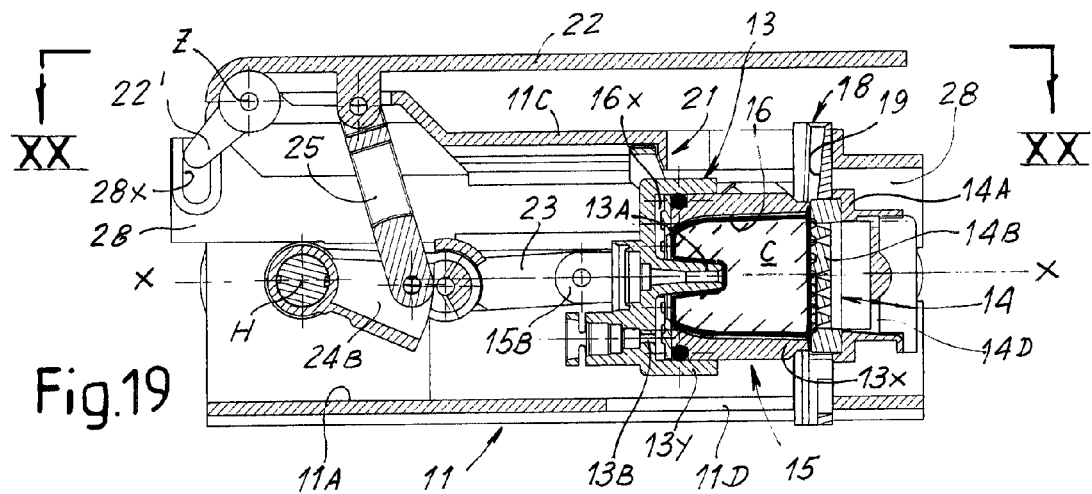
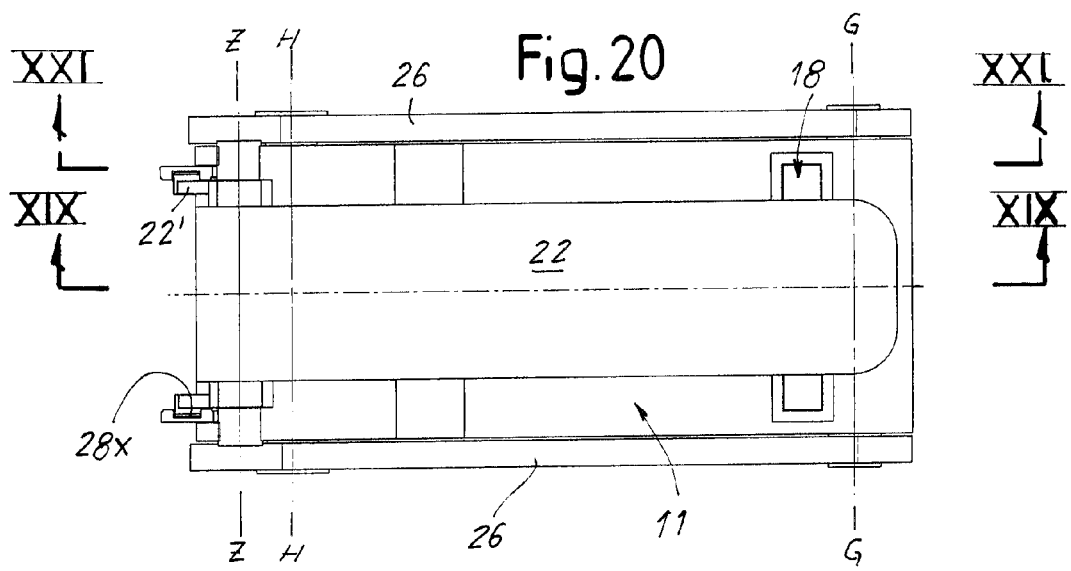
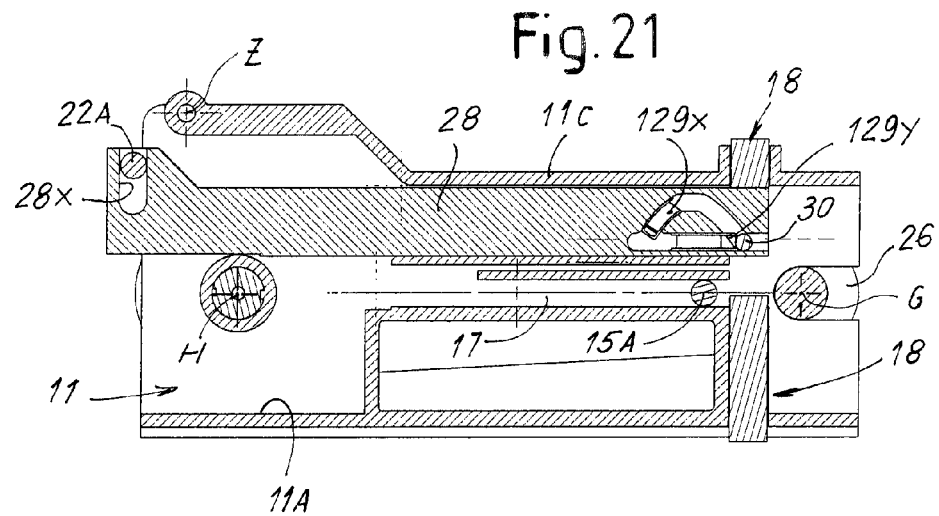

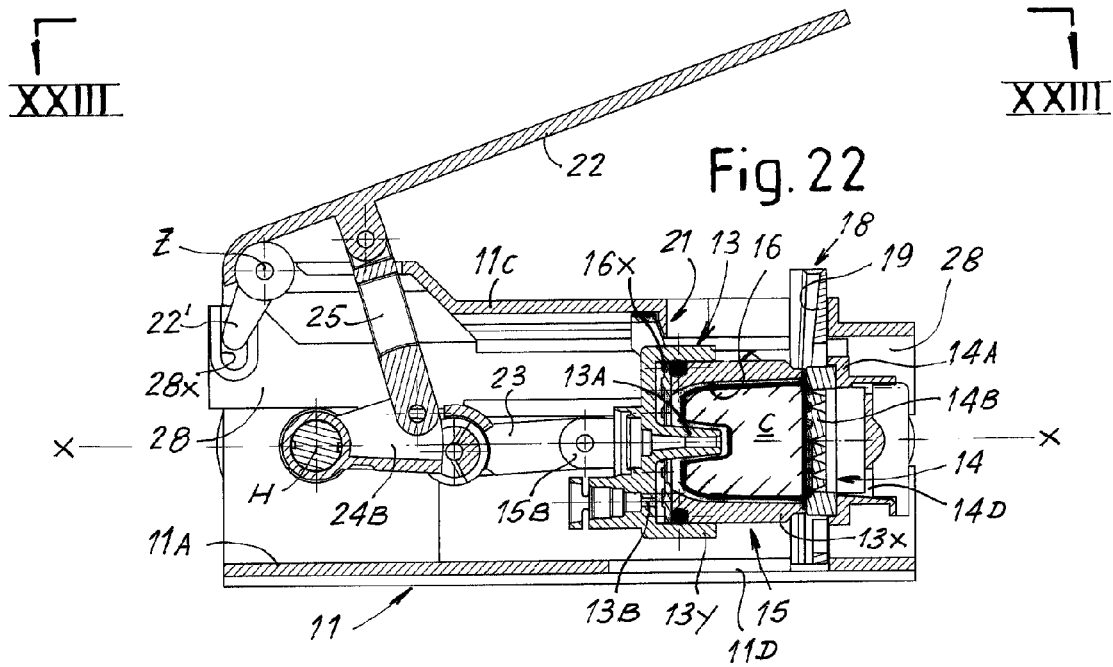
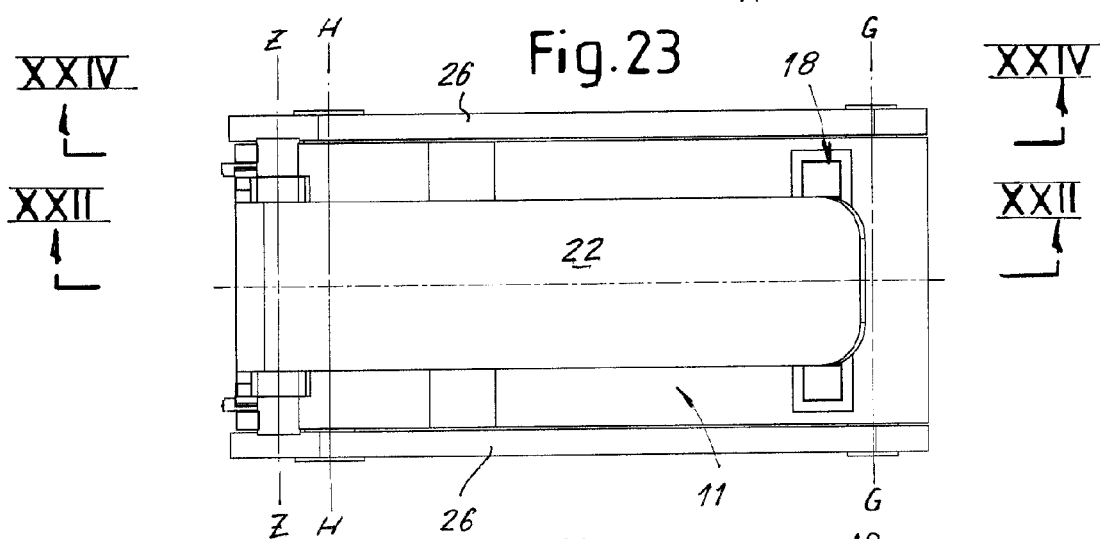
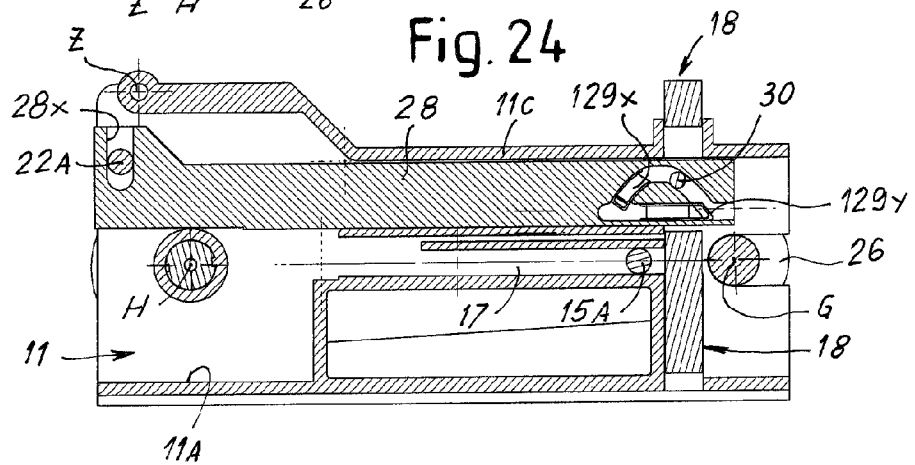

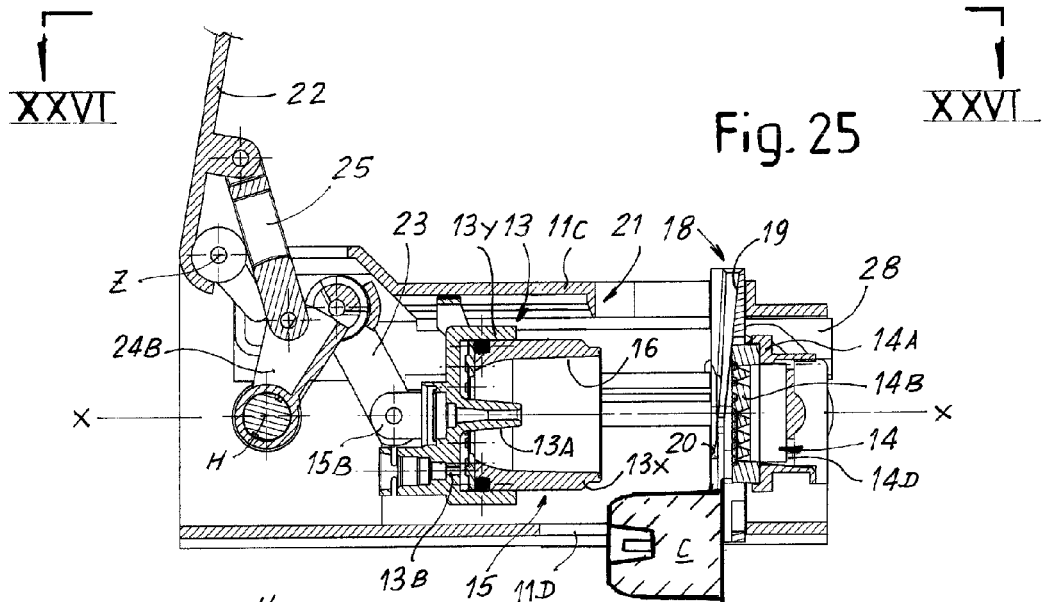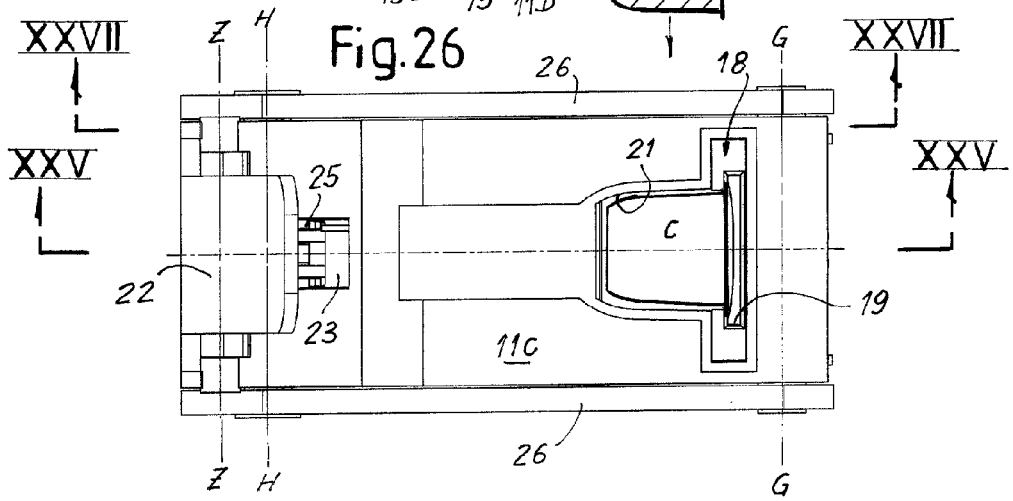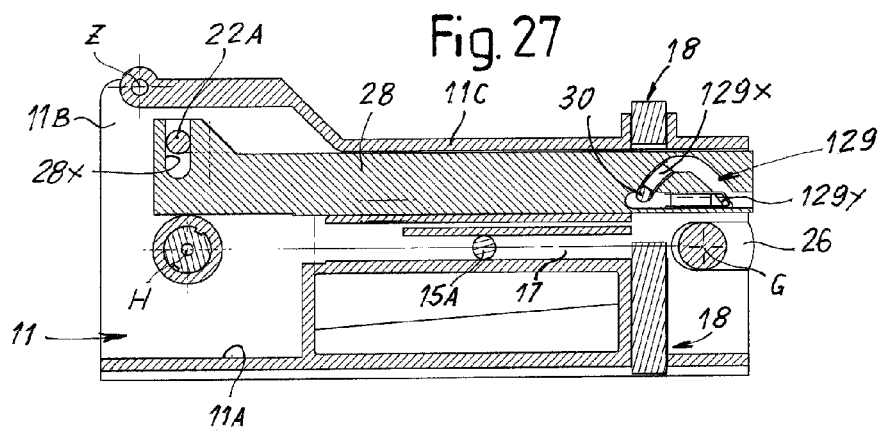

BREWING DEVICE FOR PREPARING A FOOD PRODUCT

TECHNICAL FIELD

The present invention relates to machines for producing beverages or other food products by brewing starting from capsules containing the product through which a brewing liquid is caused to flow.

More in particular, but not exclusively, the present invention concerns a brewing device for preparing coffee or other hot beverages by extraction or dilution of substances contained in generally single-dose capsules.

Furthermore, the invention also concerns a machine for producing food products, such as in particular hot beverages, comprising said brewing device.

The invention further refers to a brewing method for preparing food products, such as hot beverages, from capsules.

BACKGROUND ART

As it is known, for preparing hot beverages and other food products devices are ever more frequently used, which utilize packages, i.e. usually single-dose capsules, which contain the substance which is dissolved in water or from which the aromas are extracted by means of the passage of hot water. Such devices or machines are typically used for preparing coffee-based beverages.

Hereinafter, both with reference to the present description and to the enclosed claims, under capsule any type of packaging, usually a single-dose type, is meant, apt to be used in this type of devices. Such capsules can be sealed, pierceable with suitable piercers or provided with a pervious surface, i.e. a surface permeable to water, so as not to require piercing. The term capsule also encompasses a packaging made of non woven fabric or other permeable material, technically designated as "pod".

A very widespread type of device for brewing or extracting beverages from single-dose capsules includes a brewing chamber, usually made of two portions which can be moved one with respect to the other between an open position and a closed position. Of such two chamber portions, a first portion is fixed with respect to the frame of the device wherein the brewing chamber is defined, whereas the other chamber portion is translated by means of a lever mechanism actuated by the user (typically a lever associated to a connecting rod, in turn, hinged to the chamber portion which has to be moved).

When the brewing chamber is open, a capsule is inserted in a space defined between the two chamber portions. The insertion in this space takes place by guiding the capsule from an insertion area along a pair of opposed guiding channels. Once the capsule has moved into such space, projections implemented in the same channels prevent the capsule from falling downwards, by supporting it. With the capsule in such position, the lever mechanism is actuated and the mobile portion of the brewing chamber is moved to meet the capsule and move it towards the fixed chamber portion, in order to close the chamber and to allow the possible piercing of the capsule by needles provided in the receptacle of the chamber itself, in case the capsule is of the piercing type. Therefore, after piercing (if required), hot water flows through one or more inlet channels and the outgoing of a beverage from one or more opposite discharge channels towards the device supply area.

When the mobile chamber portion meets the capsule, the latter is moved too. Depending upon the device type, it may happen that the capsule guiding channels move therewith by disengaging the capsule-supporting projections. In this case the capsule in this phase is supported by the mobile chamber portion. Alternatively, the capsule-supporting projections are fixed and the capsule is moved in additional channels without such projections, so that, when the chamber is opened once the brewing has taken place, the mobile portion does not support the capsule anymore which is then free to fall, by freeing the space for the insertion of a new capsule. An example of device with a capsule which is moved between closely spaced parallel channels (a first pair of inserting channels and a second pair of falling channels) is disclosed in WO 2005/004683.

OBJECT AND SUMMARY OF THE INVENTION

The object of the present invention is to provide a new brewing device for preparing coffee or other beverages which is particularly simple to manufacture and to use.

Within the above object, another important task of a preferred embodiment of the present invention is to provide a brewing device for preparing coffee or other beverages which is particularly reliable.

An object of further preferred embodiments of the present invention is to provide a method for producing beverages by means of a brewing device which is easy and economical to be implemented.

These and other objects which will be clearer hereinafter are reached with a brewing device for preparing a food product, especially a beverage, from capsules, comprising
 a frame whereon an area for inserting a capsule towards a brewing position area is defined;
 a brewing chamber including a first chamber portion and a second chamber portion, movably arranged in an area defined by the frame; such chamber portions can move both one with respect to the other between a closed position and an open position and vice versa, and with respect to said frame;
 ducts, respectively for supplying a brewing fluid in the chamber and for dispensing the brewed product from said chamber;
 a pair of opposed guiding channels for inserting the capsule in the brewing position fixed with respect to the frame;
 at least one capsule supporting member (preferably two supporting members) supporting the capsule in said brewing position.

The capsule supporting member(s) can be reversibly moved between a supporting position and a disengaged position, in said disengaged position allowing the capsule to fall from the brewing position downwards.

The device according the invention can be inserted inside a more complex machine, for example a coffee machine equipped with additional members known per se such as a boiler, a pump for supplying hot water, a coffee dispensing spout, etc.

In some embodiments, the first chamber portion and the second chamber portion are arranged slidingly in a sliding area of the frame. In preferred embodiments, the first chamber portion and the second chamber portion are movable along a sliding direction, i.e. a sliding axis, substantially orthogonal to a capsule insertion direction. The sliding direction is preferably substantially parallel to an axis of the capsule when the capsule is in said brewing position. The sliding direction extends preferably horizontally and the capsule insertion direction is preferably approximately vertical. By approximately vertical a direction of capsule insertion is understood, which allows the capsule to fall into the brewing position by gravity. Said direction does not require to be exactly vertical, but rather it can be inclined with respect to the vertical direction, provided the capsule can be introduced by gravity. The capsule is introduced in an aperture provided in the insertion area of the frame, and falls down by gravity until it reaches the brewing position.

The capsule is preferably provided with a flange engaging the guiding channels, such that the capsule will reach its brewing position by sliding along the guiding channels until it abuts against said capsule supporting member. The capsule supporting member is preferably in the form of an abutment. Preferably a pair of abutments, e.g. a pair of projections are provided, one for each guiding channel. In some preferred embodiments, the projections are provided in the channels and the distance therebetween is less than the diameter of the capsule flange. In the brewing position the axis of the capsule is preferably substantially coincident with the axis of the brewing chamber.

In preferred embodiments, said first chamber portion, said second chamber portion and said at least one capsule supporting member are designed and arranged to maintain the capsule in a fixed position with respect to the frame, said first chamber portion and said second chamber portion being movable one towards the other to close the chamber, the capsule being maintained in the brewing position defined by said at least one capsule supporting member, said position being achieved by the capsule at the end of its falling movement along the guiding channels.

In some embodiments, the guiding channels are arranged between the first chamber portion and the second chamber portion when the first chamber portion and second chamber portion are in the open position.

The guiding channels and the capsule supporting member(s) preferably form a single component. In some preferred embodiments they are made integral to one another. For example, the capsule supporting member(s) is(are) provided in the guiding channels and are preferably shaped as projections in said channels. Opposing projections at the same height in both guiding channels define a restriction area, where the capsule abuts against the projections and remains trapped in the brewing position until the capsule supporting members are forcedly moved thus deforming the capsule or a portion of the capsule engaged by said capsule supporting members. In preferred embodiments, the distance between opposed projections in said guiding channels is less than the maximum diameter of a capsule flange, the capsule being retained in the brewing position by co-action of the flange and said projections forming the capsule supporting members.

In some embodiments, the guiding channels and the capsule supporting member(s) are provided on a reciprocally moving positioning member, movable in a direction substantially orthogonal to a direction of motion of the first and second chamber portions. Moreover, the positioning member is controlled to be upwardly moved when the brewing chamber is in a closed position, to disengage said capsule from said capsule supporting member(s).

In some particularly advantageous embodiment a lifting device is provided for reciprocally moving the positioning member. The guiding channels and the capsule supporting member(s) are advantageously formed on said positioning member. Said lifting device can include at least one slider slidingly movable parallel to a direction of movement of said first chamber portion and said second chamber portion. Said at least one slider preferably includes a cam co-acting with a follower connected to said at least one capsule supporting member, such that the movement of said slider causes a movement of said at least one capsule supporting member in a direction substantially orthogonal to the movement of said slider.

A single supply duct for supplying a brewing fluid in the chamber and a single outlet duct for causing the brewed beverage to flow out from said chamber can be provided. In other embodiments, a different number of inlet and/or outlet ducts can be provided.

For the purposes of the present invention, the device frame is considered substantially fixed during use with respect to an absolute reference system wherein the area for inserting the capsule in the device defined in the frame is motionless.

According to the invention the capsule housed in the brewing position never changes position with respect to the frame during closure of the brewing chamber. In fact both portions of the brewing chamber are put in motion for implementing in an extremely simple way all the motions necessary to close the brewing chamber and to perform the possible piercing by means of a piercer, e.g. including piercing needles, and to open the chamber and remove the capsule from the needles, as well as to discharge the capsule from the brewing position. This involves a considerable advantage in terms of reliability of the device and of structural simplicity of the same with respect to the devices of known type.

According to a preferred embodiment of the invention, at least one capsule supporting member is arranged to support the capsule from the bottom and it can be controlled to be reversibly moved between a supporting position and a freeing position by allowing the capsule to fall from the brewing position directly downwards.

According to a preferred embodiment of the invention, the device comprises a control lever for opening/closing the brewing chamber, connected to a single mechanical transmission) for moving both chamber portions between the closed position and open position and vice versa.

In some advantageous embodiments, with a single control member, such as a control lever, and preferably without the help of any actuator, it is possible to move both brewing chamber portions. This greatly simplifies the structure and the control of the device over the known prior art devices. In particular, as will be apparent from the following description of preferred embodiments of the invention, the device has a simple structure also in order to remove the capsule from the chamber portion containing it even in case piercers are present.

In other embodiments, the device can include a single actuator, such as an electric or hydraulic actuator, to control the movement of both moving chamber portions, with the aid of a single linkage, i.e. a single kinematic transmission. The same actuator can also control the movement of a lifting device which reciprocatingly moves the positioning member on which the guiding channels and preferably the capsule supporting member(s) are arranged.

According to a particularly advantageous preferred embodiment, the device according to the invention provides a moving member, i.e. a motion means, moving said at least one capsule supporting member. Preferably the moving member is designed to move said at least one capsule supporting member along a plane which is substantially coincident or parallel to the plane on which the axes of the guiding channels are placed, i.e. the movement of said at least one capsule supporting member is parallel to the longitudinal extension of said guiding channels. The motion of the capsule supporting member on such plane allows considerably simplifying the device structure, for example limiting considerably the whole overall dimensions of the device as the channels do not need space along the "axis" of the device (under axis the sliding direction of the portions of the brewing chamber inside the frame sliding area is meant). According to a preferred embodiment of the invention the moving member for moving the capsule supporting member(s) comprises an upwardly and downwardly moving translation member in the form of a slider or a frame.

Preferably the motion means are designed to reciprocally move said at least one capsule supporting member on a plane substantially coincident or parallel to said guiding channels. In some embodiments, said motion means are designed to reciprocally moving said at least one capsule supporting member in a direction substantially orthogonal to the direction of movement of the first chamber portion and the second chamber portion.

As mentioned, according to another aspect, the invention also refers to a brewing method for brewing a food product, such as a beverage, from a capsule by means of a brewing device. Such method is characterized by:
  guiding the capsule towards a brewing position which is fixed with respect to the frame of a brewing device,
  supporting from the bottom the capsule in said brewing position,
  approaching from opposed directions two portions of a brewing chamber towards the brewing position wherein the capsule is arranged,
  closing the brewing chamber,
  causing a brewing fluid to flow through said brewing chamber,
  disengaging the capsule allowing it to fall downwards from said brewing position.

According to a preferred embodiment of the present method, the step for freeing the capsule to allow it to fall downwards provides moving at least a capsule supporting member upwardly from said brewing position, while retaining said capsule in the brewing position whereas the supporting member deforms a capsule portion contacted by said supporting member. In some embodiments said capsule portion is formed by part of a capsule flange. The capsule portion practically forms an obstacle against the upward motion of the supporting member, such during the upward movement thereof, said supporting member deforms said capsule portions to move upwardly beyond the capsule portion.

According to a further aspect, the invention concerns a brewing device for preparing a food product, especially a beverage, from capsules, comprising: a frame; a capsule insertion area; a brewing chamber including a first chamber portion and a second chamber portion, movable one with respect to the other between an open position and a closed position and vice versa; ducts, respectively for supplying a brewing fluid in the brewing chamber and for dispensing a brewed product from the brewing chamber; a pair of opposed guiding channels for inserting the capsule from the top in a brewing position, said channels being arranged between said first chamber portion and said second chamber portion when said first chamber portion and said second chamber portion are in the open position; at least one capsule supporting member for supporting the capsule in said brewing position. The at least one capsule supporting member is arranged and controlled to be lifted from a brewing position to a capsule disengaging position before said brewing chamber is opened after completion of a brewing cycle, a lifting movement of said at least one capsule supporting member causing said capsule to disengage from said capsule supporting member.

According to still another aspect, the invention concerns a method for brewing a beverage from a capsule by means of a brewing device, comprising the steps of
  guiding the capsule in a brewing position fixed with respect to a frame of the device,
  supporting from the bottom the capsule in said brewing position,
  approaching from opposite directions two portions of a brewing chamber towards said brewing position with capsule, while said capsule is maintained in a fixed position with respect to said frame,
  closing the brewing chamber defined by said chamber portions,
  making a brewing fluid flowing through said chamber,
  disengaging the capsule from below, allowing it to fall downwards directly from said brewing position.

According to yet another aspect of the invention, a system is provided, comprising:
  a capsule containing at least one product or ingredient for the preparation of an edible product, preferably a hot beverage, such as coffee or a coffee-based beverage; said capsule preferably including a side wall, a bottom wall and a top wall, enclosing an inner volume containing said at least one product or ingredient, said capsule preferably comprising a flange surrounding said body, e.g. around one of said bottom wall or top wall;
  a brewing device comprising a brewing chamber having a first chamber portion and a second chamber portion, movable one with respect to the other, preferably along a translation axis, said axis being oriented preferably horizontally; said first and second chamber portions being movable from an open position to a closed position;
  capsule guiding channels, extending from a capsule insertion area towards a brewing position;
  at least one capsule supporting member, preferably integrally movable with said guiding channels; said guiding channels and said capsule supporting members being arranged such that said capsule moves by gravity in a direction of capsule insertion along said channels towards said brewing position defined by said capsule supporting members;
  actuating means for moving said first chamber portion and said second chamber portion towards said brewing position without moving said capsule, to close said brewing chamber with the capsule therein;
  wherein said capsule supporting member, said first chamber portion and said second chamber portion are arranged and controlled such that said capsule supporting member is moved in a direction opposite to said direction of capsule insertion to disengage the capsule while said capsule is still retained in said brewing chamber.

In preferred embodiments, said first and second chamber portions are controlled such that they remain in a closed brewing position until said at least one capsule supporting member has disengaged the capsule.

Preferably, two capsule supporting projections are provided, one in each said guiding channels, said supporting projection forming said capsule supporting member(s). The capsule is preferably disengaged from said capsule supporting member(s) by deforming at least a portion of a flange of said capsule, said flange being slidingly engageable in said guiding channels for moving said capsule from said insertion area towards said brewing position. The distance between said capsule supporting projections being less than the diameter of the capsule flange.

Said guiding channels and said capsule supporting member(s) are preferably dimensioned such that opposing outer portions of the capsule flange engage said capsule supporting member(s) while sufficient space remains to sealingly engage both faces of said flange by said first and second brewing chamber portions to sealingly enclosed said capsule in said brewing chamber.

The guiding channels are preferably provided in a movable capsule positioning member, said positioning member surrounding an empty space, said first and second brewing chamber portions being movable to partly enter said empty space and sealingly engage the flange of the capsule while said flange is engaged in the guiding channels and with said capsule supporting member(s).

According to yet another aspect, the invention concerns a brewing system for producing an edible product, preferably a hot beverage, such as specifically though not exclusively a coffee or a coffee-based beverage, from a capsule, comprising:

a capsule with a body containing at least one product or ingredient for the preparation of said edible product;
a brewing chamber comprising at least a first chamber portion and a second chamber portion, movable from an open position to a closed brewing position and vice-versa;
opposing capsule guiding channels for guiding said capsule from a capsule insertion area towards a capsule brewing position, along a capsule insertion direction;
at least two opposing capsule supporting projections, said opposing supporting projections being distanced less than the diameter of said flange, such that said capsule is retained in said brewing position by abutment of said flange against said at least two opposing capsule supporting projections;
said brewing chamber portions and said capsule supporting projections being arranged and controlled such that after a brewing cycle, while the capsule is still retained in said brewing chamber said capsule supporting projections are moved in a direction opposite said capsule insertion direction such as to disengage the capsule flange by deforming said capsule flange.

BRIEF DESCRIPTION OF THE DRAWINGS

Additional features and advantages of the invention will result clearer from the description of a preferred, but not exclusive, embodiment thereof, shown by way of example and not for limitative purposes in the enclosed drawings, wherein FIG. 1 shows an axonometric view of a brewing device according to the invention, with the actuation lever in raised position;

FIG. 2 shows a side view of the device of FIG. 1, with the actuation lever in lowered position;

FIG. 3 show a top view of the device of FIG. 2;

FIG. 4 shows an axonometric view of a first group of components of the device according to the previous figures, with the lowered actuation lever.

FIG. 5 shows an axonometric view of a second group of components of the device according to the previous figures;

FIGS. 8 to 11 shows cross sections of the device of the previous figures, shown in different working steps; in particular the figures marked with "a" show a section according to the middle plane a-a of FIG. 3, whereas the figures marked with "b" show sections according to a plane b-b of FIG. 3, parallel to the plane a-a, figures with the same number followed by the letter "a" and "b" relating to the same step of the brewing cycle;

FIGS. 19-30 show sections and plan views similar to those of FIGS. 16 to 18 in various subsequent positions taken by the brewing device according to the second embodiment during a complete operating cycle;

DETAILED DESCRIPTION OF AN EMBODIMENT OF THE INVENTION

Embodiment of FIGS. 1-11

Figure 7:
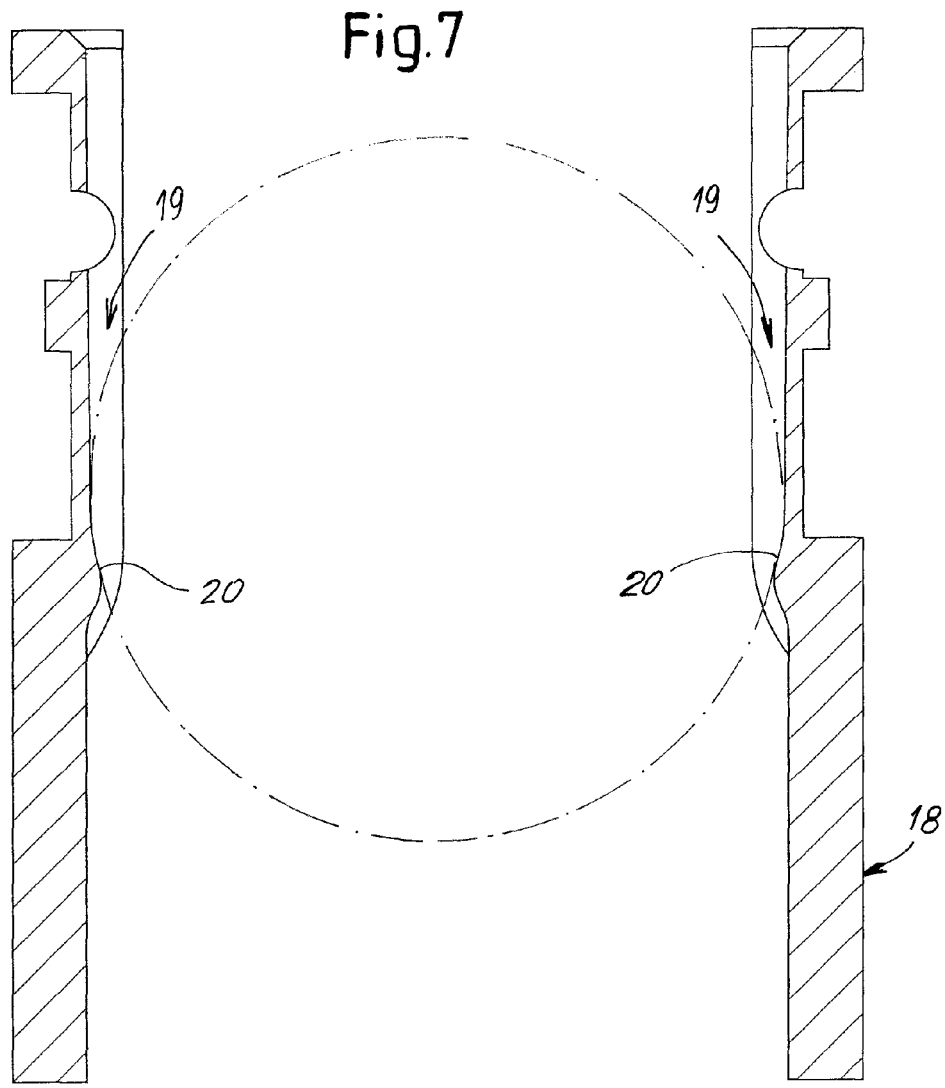
FIG. 7 shows a front view of the component of FIG. 6 in section according to the plane VII-VII of FIG. 6.
Figure 6:
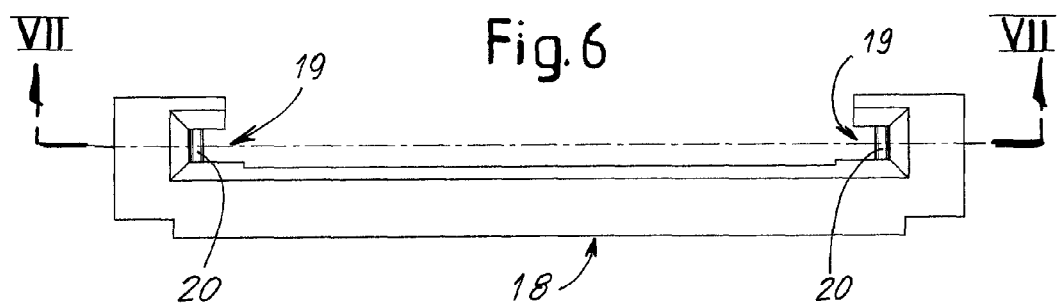
FIG. 6 shows the top view of a component of the device shown in the figures, apt to guide and support a capsule which can be used in the device.

In the enclosed drawings a device according to the invention is illustrated, limitedly to the members necessary to the understanding of the invention itself. As already mentioned, it shall be understood that the device according to the invention can be inserted inside a more complex machine, for example a coffee machine equipped with additional members known per se such as a boiler, a pump for feeding hot water, a spout for dispensing coffee, etc.

By referring to the previously mentioned figures, a brewing device according to the invention is designated as a whole with the number 10. It comprises an outer frame 11 with mainly longitudinal development, for example formed by a bottom 11A, two longitudinal walls 11B and a top 11C. Such frame, substantially hollow inside, centrally defines a sliding area 12 for two brewing chamber portions, respectively a first chamber portion 13 and a second chamber portion 14. The sliding takes place along the central longitudinal axis X of the frame, which coincides then with the sliding direction.

In particular, the first brewing chamber portion 13 has a body 15, preferably with a cylindrical shape, e.g. in the shape of a bowl or cup which has inside thereof a cavity 16 apt to receive a capsule C. In this embodiment the capsule C, for example, is of the type with a flared body and upper face C' equipped with a closing wall, e.g. formed by a plastic foil. In general terms, the capsule C has a body with an inner volume defined by the side wall (preferably a cylindrical or frusto-conical wall) said upper face or top wall C' and an opposed bottom wall. The top wall C' can be formed by a foil, such as an apertured foil, i.e. a foil provided with holes or apertures. In other embodiments the foil is watertight and can be pierced upon closure of the brewing chamber. The opposite bottom wall can also be apertured or can be closed and piercers can be provided to pierce holes in the bottom wall upon closure of the brewing chamber. In the embodiment shown in the drawings, the capsule has an annular flange C'', surrounding the upper face or top wall C'. As shown in the figures, when the capsule C is housed in the first chamber portion 13, the capsule flange C'' abuts on the ending edge of the cup-shaped body 15 and by closing the brewing chamber the capsule will be sealingly engaged in the brewing chamber by sealingly engaging the opposed sides of the flange C'' with the edges of the first chamber portion and the second chamber portion 14.

The first chamber portion 13 is constrained to translate along a pair of longitudinal guides 17 provided on the side wall 11B of the frame 11 (in the figures in side section only one is shown, the one seen from the section plan, the other one being defined on the other not visible wall), for example by means of a pair of first opposed cursors 15A, which extend laterally from the cup-shaped body 16. Preferably, as shown in the drawings the cursors 15A are cylindrical in shape.

A capsule identifier 13A extends from the bottom of the first chamber portion 13. A supply duct 13B for the brewing fluid, such as pressurized hot water, ends at the bottom of the chamber portion 13. In some embodiments, upwards of the supply duct 13B an anti-dripping/anti-emptying valve 13C for the hydraulic supply circuit is arranged.

In some embodiments, the second portion of brewing chamber 14 comprises a hollow body 14A. In some embodiments, a first side of said hollow body 14A is closed by a buffer in the form of a plate 14B, provided with a plurality of holes 14C and apt to close the cup-shaped body 15 of the first chamber portion 13 when the brewing chamber is closed. The hollow body 14A further has an opposed second side equipped with an outlet duct 14D for the beverage. The hollow body 14A is restrained to a small frame 14E constrained to translate along the axis X. In particular, the small frame 14E, on opposed flanks, has second cursors 14F, for example with rectangular shape, slidingly arranged in the longitudinal guides 17.

The holes 14C of the intermediate closing plate 14B allow the passage of the beverage extracted from the capsule at the desired pressure. In some embodiments, the plate 14B is also provided with piercing members, not shown in the figures, for piercing the upper face C' of the capsule C, in particular if said upper face is watertight. The plate is shaped so as to adhere sealingly onto the flange C'' of the capsule C when the brewing chamber is closed.

It is to be noted that in this example the capsule C is of the type with one face permeable to the liquids, i.e. provided with holes to allow the passage of the brewing liquid. Such face is the one which results to face towards the bottom of the cup-shaped body 15 of the first chamber portion 13. Onto such bottom there is no piercing member. According to other embodiments of the invention, onto such first chamber portion 13 even one or more piercing members could be provided, in case of capsule which can be pierced on both faces. In other embodiments capsules could be used having a wall permeable to the extracting fluid, which has to face the plate and therefore on this one there will be no other piercing members.

As it will be better explained hereinafter, the brewing chamber portions 13 and 14 translate between an open position (FIGS. 8a, 8b) and a closed position (FIGS. 2, 3, 4, 10a, 10b). In the open position, the chamber portions are distanced along the axis DD and the capsule C can be inserted in the device in order to place it in a brewing position P. In the closed position, the chamber portions 13 and 14 are coupled one to the other, with the plate 14B closing the cup-shaped body 15 and the capsule C is contained inside thereof, between the receptacle 16 and the plate 14B. As will be clearer hereinafter, the brewing position P is fixed with respect to the frame 11, i.e. once it has been placed in the brewing position P, with the brewing chamber in the open position, the capsule does not move with respect to the frame 11 of the device, until the end of the brewing cycle, when the capsule is ejected as will be described later on.

It is to be noted that both the first chamber portion 13 and the second chamber portion 14 are allowed to make a slight oscillation with respect to two horizontal axes intersecting the sliding direction X (and in particular respectively around axes passing though 15A and 14F) in order to recover possible light structural clearances and avoid locking during the sliding thereof along X.

In order to make the capsule C to assume the brewing position P, a positioning member 18 is provided, in this example advantageously in the shape of a frame-like body, whereon two opposed parallel guiding channels 19 are formed for opposed portions of the flange C'' of the capsule C. The guiding channels 19 are spaced apart by a distance substantially equal or slightly greater than the outer diameter of the flange of the capsule. I.e. the bottom walls of the two guiding channels 19 are spaced apart by a distance equal to or slightly greater than the diameter of the flange C'' of the capsule C. The side walls of the guiding channels 19, i.e. the depths thereof, are dimensioned such that the flange is safely engaged and guided while the capsule falls down towards the brewing position P.

Such guiding channels further end in a middle position of the positioning member 18, at a pair of projections 20 projecting from the channels and which act as supporting members for the capsule. In fact, such projections 20 have a smaller distance than the outer diameter of the capsule flange and therefore when the latter is inserted in the guiding channels 19 by means of the insertion area 21 arranged on the top of the frame 11C, the capsule falls along the channels until it reaches the projections 20, which will support it. The distance between said projections is indeed smaller than the diameter of the capsule flange C'', such that the capsule flange interferes with the projections 20 and is retained thereby in the brewing position P.

In this embodiment, the positioning member 18 takes a substantially fixed position along the longitudinal axis X of the sliding area 12. This does not mean that it is not mobile (as better explained later, such positioning member can translate vertically, i.e. orthogonally to the axis X) but simply that it cannot be moved along the axis X, i.e. along the sliding direction of the brewing chamber portions 13 and 14. In the preferred embodiment, the orientation of such frame-shaped positioning member is substantially orthogonal to the axis X, i.e. the channels 19 are orthogonal to the sliding direction of the brewing chamber portions.

Hereinafter the mechanical components allowing the operation of the device will be described. Hereinafter, by sake of simplicity, such components will be mentioned singularly, whereas in the preferred embodiment in actual fact they are (as it is well visible from the figures) constituted by pairs of components arranged symmetrically with respect to a vertical plane whereon the axis X lies.

As mentioned, the brewing chamber portions 13 and 14 can translate one with respect to the other and with respect to the frame 11 along the axis X. In order to allow opening or closing the brewing chamber, there is a control lever 22 connected to a mechanical connection for moving the two chamber portions 13 and 14 between the closed position and opened position and vice versa. I.e. a single mechanical transmission system is provided for moving both chamber portions 13, 14 with a single control lever 22, such that the movement of the lever causes the two chamber portions 13, 14 to approach one to the other for closing the brewing chamber and then to be spaced apart to open the brewing chamber upon termination of the brewing cycle.

The control lever 22 is hinged to the frame 11 according to an axis Z orthogonal to the axis X and orthogonal to the channels 19, in this example a horizontal axis. Such lever 22 is connected by means of an intermediate unit to a first pushing connecting rod 23 hinged to a projection 15B of the first brewing chamber portion 13 according to a horizontal pivoting axis F intersecting the axis X. The push of the first connecting rod 23 on the first chamber portion 13 allows the translation thereof along the axis X. More in particular, the above-mentioned intermediate group comprises a crank 24A hinged at an end to the first pushing connecting rod 23 and with the opposite end to the frame 11 by means of a horizontal axis H intersecting the axis X (as it can be seen in the figures, the rotation of the crank is limited angularly, that is it does not perform a complete rotation, not being necessary for the purposes of the motion of the first chamber portion). The intermediate unit further comprises a rocker arm 24B hinged coaxially to the crank 24A, which has two opposed rabbetings 24B' e 24B" spaced apart angularly therebetween with respect to the rotation axis H. The crank 24A is arranged between said rabbetings 24B' and 24B" and therefore the same rabbetings 24B' and 24B" are apt to collide alternatively against said crank 24A according to the direction of rotation of the rocker arm around axis H. At last, the intermediate unit comprises a second connecting rod 25 the ends of which are hinged respectively in an intermediate position of the rocker arm 24B and to a projection 22' of the lever 22 approximately opposed to the hinge axis Z.

In this example the second connecting rod 25 has a bent configuration to follow partially the shape of the hinging pin according to the axis H of the rocker arm 24B when the lever 22 is raised upwards (thereto the open position of the brewing chamber corresponds; see FIGS. 8a, 8b, 9a, 9b). In this position, that is with the lever 22 raised upwards, the crank 24A and the first pushing connecting rod 23 form an acute angle with a downwardly facing vertex. From this position, a lowering of the control lever 22 causes a raising of the second connecting rod 25 and a consequent rotation upwards of the rocker arm 24A which for a determined angle comprised between the rabbetings 24B' e 24B" rotates without any effect as far as the second rabbeting (the lowest one) 24B" collides onto the crank 24A, thereto the raising of the end of the same crank 24A and of the first connecting rod 23 hinged thereto and the consequent push of the brewing chamber portion 13 towards the brewing position P correspond.

As mentioned above, the mechanical connection which from the control lever 22 causes the movement of the first brewing chamber portion 13, at the same time also causes the coordinated and joined motion of the second brewing chamber portion 14. This takes place thanks to a third motion connecting rod 26 which is hinged, according to a horizontal axis G intersecting the sliding axis X, at one end to a pin 14F projecting laterally from the second brewing chamber portion 14. Such pin 14F is integral with the second brewing chamber portion 14 and it translates integrally therewith. At the opposite end, such third connecting rod 26 is hinged in an eccentric way to the hinging pin with respect to the axis H of the crank 24A. Practically, a rotary motion of the crank 24A by means of the control lever 22, thanks to the eccentric hinging, causes an eccentric rotation and therefore a lowering or raising of the hinging end of the connecting rod 26 and a consequent motion of the axis G along a direction parallel to the axis X, that is it causes a translation of the second brewing chamber portion 14 along the axis X. Therefore, a rotation of the lever 22 downwards leads to a translation of the first brewing chamber portion 13 towards the brewing position P and at the same time a translation of the second chamber portion 14 towards the brewing position P to close the chamber; a rotation of the lever 22 from the bottom upwards leads to a translation of the first chamber portion 13 from the position P to open the chamber with consequent translation in opposite direction of the second portion of chamber 14.

It is to be noted that the third connecting rod 26 is outside the frame 11. The pin 14E is a through pin extending through an opening (not shown in the figures) defined on the side wall 11B of the frame 11 elongated in the direction of the axis X to allow the translation of the pin.

From a dimensional point of view, the translation of the first chamber portion 13 is much broader than the translation of the second chamber portion 14. The latter, in reality, is very limited; for example it is given by the difference of the segments T' and T" shown in FIGS. 8a and 10a, respectively.

In order to complete the description of the device it is necessary to explain the way in which the removal of the capsule C from the brewing position P takes place, once the chamber 13, 14 is opened after having performed the brewing.

According to the invention, this takes place without moving the capsule from the position P, since the supporting members 20 remain stationary and into engagement with the capsule until they are moved upwards, so as to disengage the capsule from the lower side and allow the capsule to fall downwards.

According to the preferred embodiment of the invention, motion means for the supporting members are provided, which control a motion thereof on a plane substantially coincident or parallel to the lying plane of the development axes of the guiding channels 19, that is, in the example in the description, according to a vertical direction. In the example, the positioning member 18, in its shape of frame-like body, is translated vertically by means of a moving member, or more in particular, lifting device 27 formed by a group of components described hereinafter. Such device 27 can be seen in FIGS. 8 to 11 marked with the letter "b" and in FIG. 5.

The lifting device 27 comprises a control mechanism with a linear cam restrained to the frame 11 and interacting both with the lever 22 and the positioning member 18, so that when the lever 22 is in the raised position, the positioning member 18 is in the position supporting the capsule C (FIGS. 8b and 9b) of, whereas a downwards rotation of the lever (FIG. 10b, 11b) corresponds to the closing of the chamber and the capsule being supported both by the first chamber portion 13 and by the supporting members 20 of the guiding channels 19 (the positioning member has not moved with respect to the previous position). In this position usually the brewing process takes place. From this point, a rotation of the lever 22 upwards (FIG. 11b) causes a vertical raising of the positioning member 18 without any motion of the first chamber portion 13 nor of the capsule C, which remains locked in the brewing chamber, closed; practically there is a delay in the first 26° of lever rotation imposed by the structure with double rabbeting 24B'-24B" of the rocker arm 24B (in the first part of the rotation the rocker arm does not push the crank 24A, until the first rabbeting 24B" meets the same crank, by pushing it downwards) such that the chamber does not open. Such vertical motion of the positioning member 18 with the locked capsule C has the effect of forcing the supporting projections 20 on the diametral ends of the flange C" of the capsule, by deforming the latter and allowing the arrangement of the projections above the same diametral ends. In reality, the projections 20 do not support the capsule any more.

By continuing the upwards rotation of the control lever 22, the brewing chamber opens (the chamber portions 13 and 14 are moved away as above described). The capsule C locked axially by the channels 19 remains in position P as long as it results to be wholly removed from the cup-shaped body of the first chamber portion 13. Once it is no more contained therein, the capsule is not supported anymore by anything and therefore it falls downwards, by freeing the brewing position P. By continuing the rotation of the lever 22, with the capsule fallen down, the positioning member 18 is lowered again in the initial position to receive a new capsule.

The lifting device 27 comprises for example a pair of elongated slides 28 arranged symmetrically with respect to the longitudinal middle plane. Hereinafter only one of these elongated slides will be referred to, being the description substantially identical for each one thereof. Each slide 28 is constrained to slide on an inner flank of the frame 11 parallel to the axis X and it comprises an eyelet shaped as a linear cam 29 and in particular formed by a first end portion 29A parallel to the development of the slide itself, that is horizontal, a second central portion 29B inclined upwards, and a third portion 29C parallel to the first portion. In such shaped eyelet 29 a pin 30 integral to the positioning member 18 is slidingly arranged.

From the opposite portion of the slide 28 with respect to the shaped eyelet 29, there is an area for interacting with the lever 22. In particular such area relates a small end flap 28A of the slide 28. Such small flap is shaped so as to allow the overlapping of a pushing appendix 22A integral to the lever 22 when the said lever is in the raised position (FIG. 8b, 9b). The pushing appendix 22A, on the contrary, is locked on the end flap 28A of the slide when the lever 22 is in the lowered position (FIG. 10b). The ending face 28A' of the end small flap 28A of the slide is bevelled towards the outside of the frame 11 (the bevelling can be seen in FIG. 5), whereas the upper face 28A" of such end flap 28A of the slide is bevelled on the upper portion towards the inside of the frame 11. Additionally, such flap 28A is elastically deformable according to a horizontal plane, that is it is flexible horizontally. During a downwards rotation of the lever 22, the pushing appendix 22A creeps on the bevelled upper face 28A" of the end flap 28A, by obliging it to bend towards the outside of the frame and allowing the appendix 22A to bring in rear position behind the ending face 28A' of the small flap 28A. During this step, the slide 28 does not translate.

Upon raising the lever 22 (for about the first 26° of rotation, FIG. 11b), the pushing appendix 22A collides against the ending face 28A' of the small flap 28A of the slide 28, by pushing it towards the second chamber portion 14, and obliging the pin 30 to travel the eyelet shaped as a linear cam 29, with consequent raising of the positioning member 18 when the pin travels the inclined portion 29A of the shaped eyelet 29. In this phase the supporting member 20 moves vertically beyond the flange C" of the capsule C, which is thus supported only by the brewing chamber. During advancement of the slide 28, the latter is subjected to means opposing the motion, such as for example an elastic member 31 in the shape of an helical spring arranged between an end of the slide 28 and the second chamber portion 14. Such elastic member 31 compresses during advancement of the slide. Therefore, upon continuing the rotation of the control lever 22, the appendix 22A moves upwards as far as positioning above the small flap 28A. At this point the elastic force of the spring 31 urges the slide to go back, by making the pin 30 to travel the shaped eyelet 29 in the opposite direction, that is by bringing back downwards the positioning member 18 (again FIG. 8b). In this phase the capsule is not supported by the first chamber portion 13 which has been retracted (raising step of the control lever 22) and therefore it falls downwards. The positioning member 18 is brought back in the position for receiving a new capsule, corresponding to the brewing position P.

Summarizing, the operation of the device is the following one. It is to be noted that the FIGS. 8a, 9a, 10a and 11a show the motion of the chamber portions 13 and 14, whereas FIGS. 8b, 9b, 10b and 11b show the motion of the positioning member 18. The same working step of the device corresponds to equal numbers of figure.

Figure 8A:
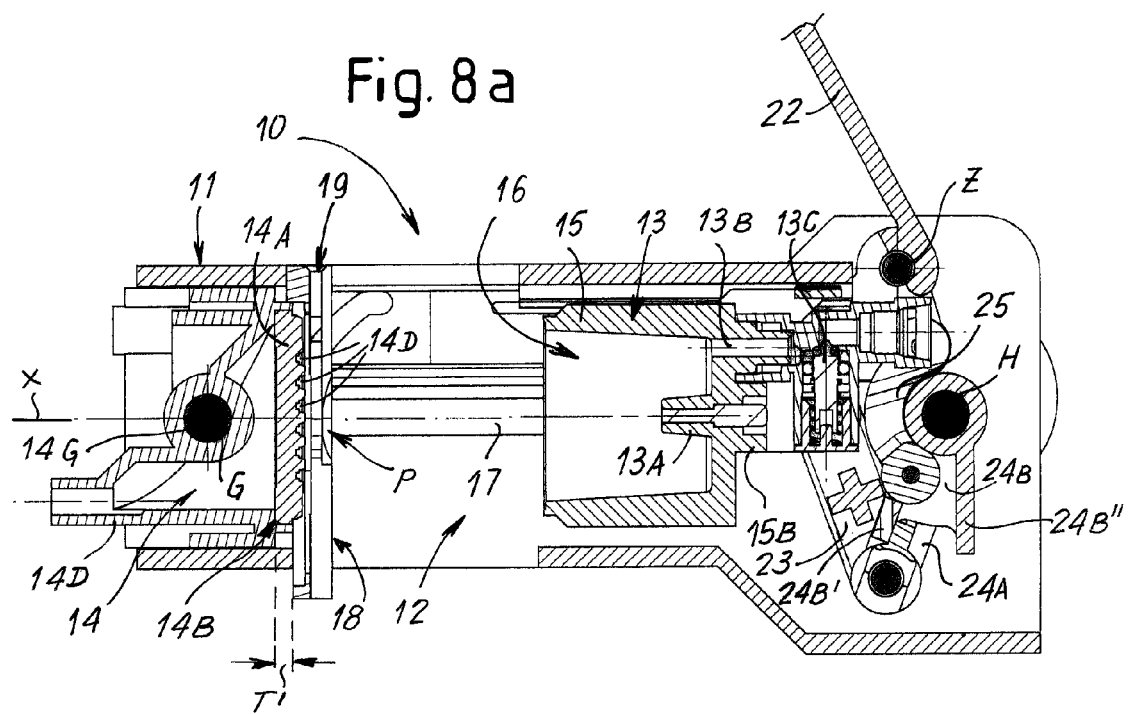
Figure 8B:
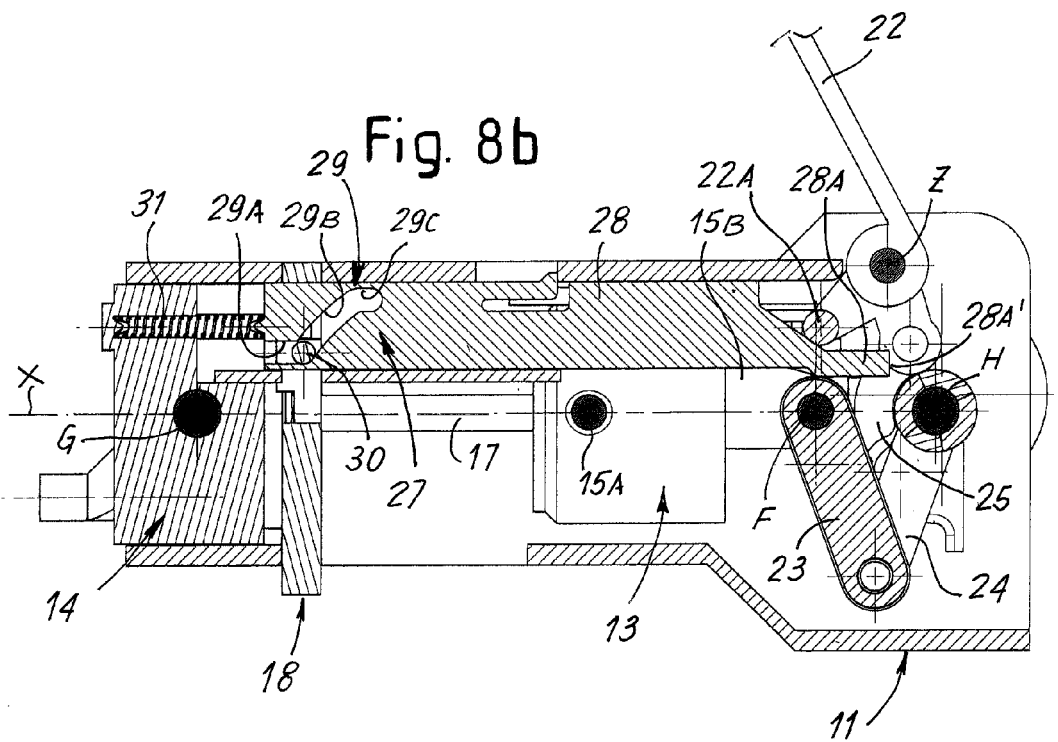

In FIGS. 8a and 8b the device with the open chamber is shown, waiting for the insertion of a capsule. The control lever 22 is raised, the slide 28 is back with the pin 30 of the positioning member 18 on the first horizontal end portion 29A of the shaped eyelet 29 and with the pushing appendix 22A of the control lever on the bevelled upper face 28A" of the small flap 28A. The positioning member 18 is lowered to receive a capsule.

In FIGS. 9a and 9b the situation of FIG. 8 is substantially shown, but with a capsule C positioned in the guiding channels 19, resting upon the supporting projections 20, i.e. in brewing position P. The control lever 22 is still wholly raised. The flange C" of the capsule is engaged in the guiding channels. Since the distance between the projections 20 is less than the outer diameter of the flange C", the capsule is retained in position P and is prevented from moving downwards beyond the projections 20.

Figure 10A:
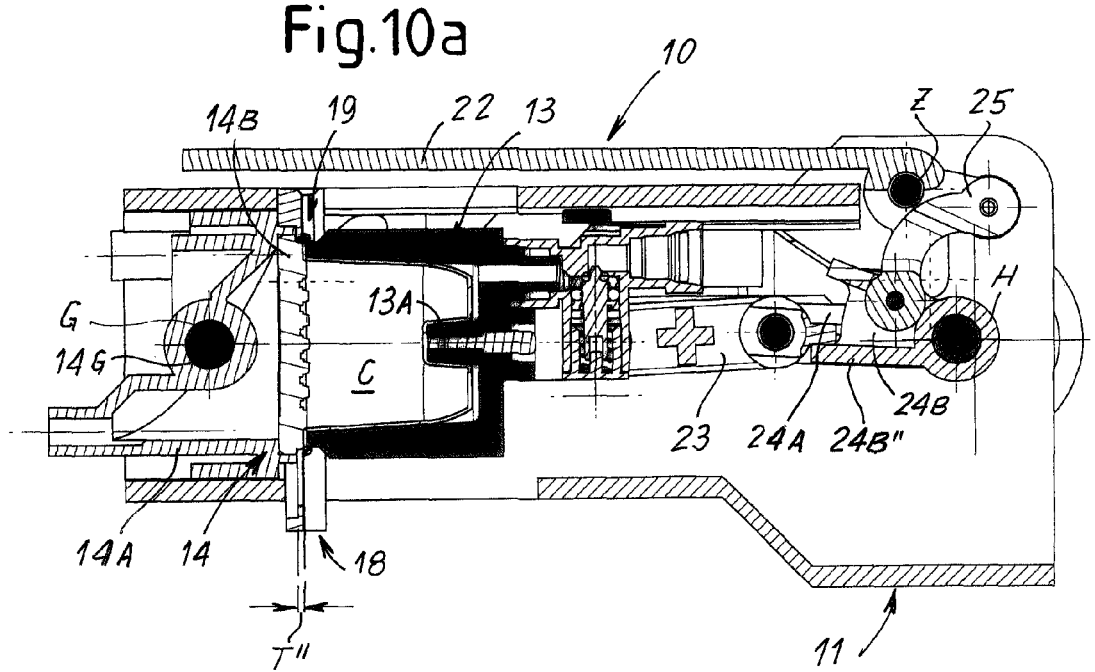
Figure 10B:
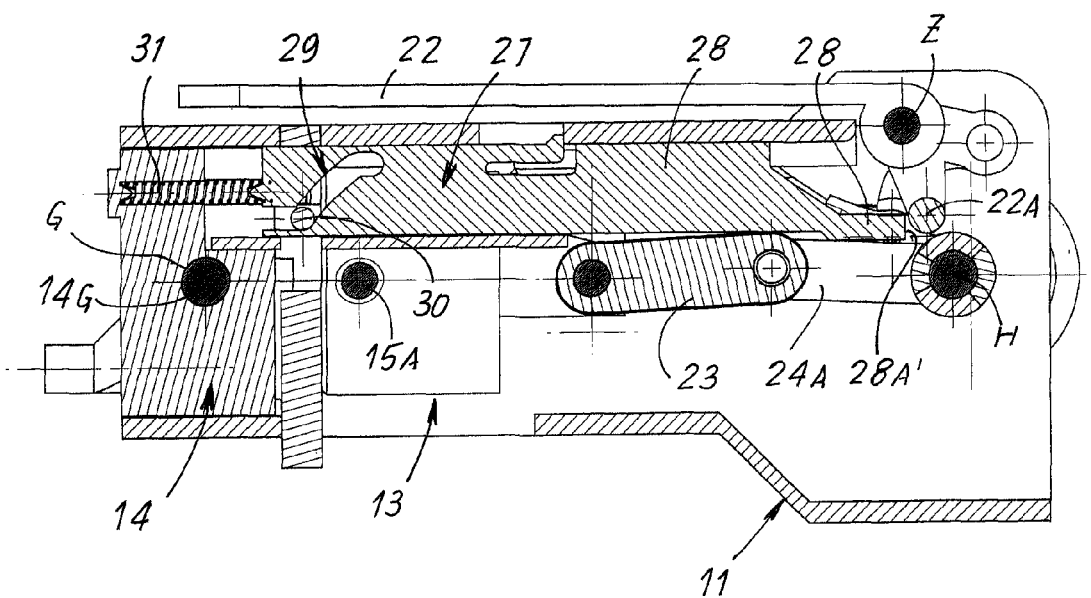
Figure 11A:
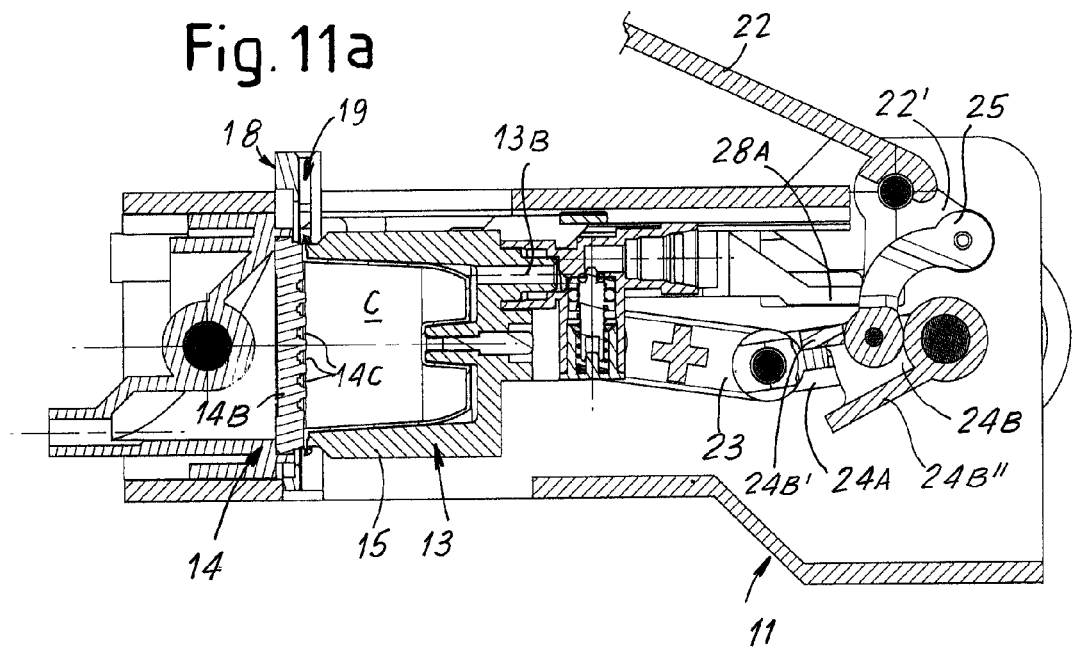
Figure 11B:
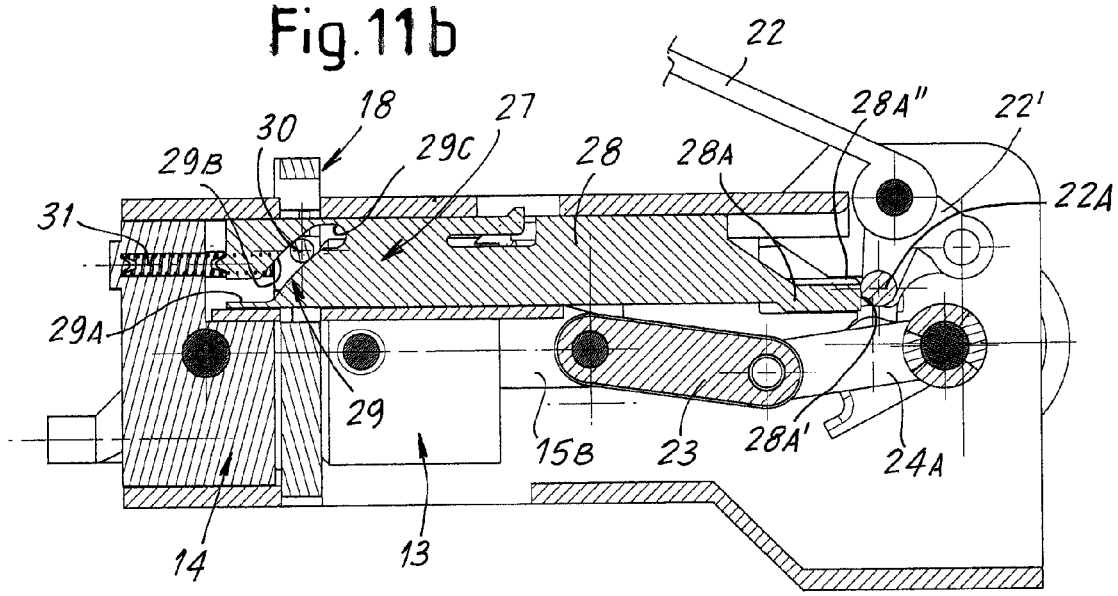
Figure 12:
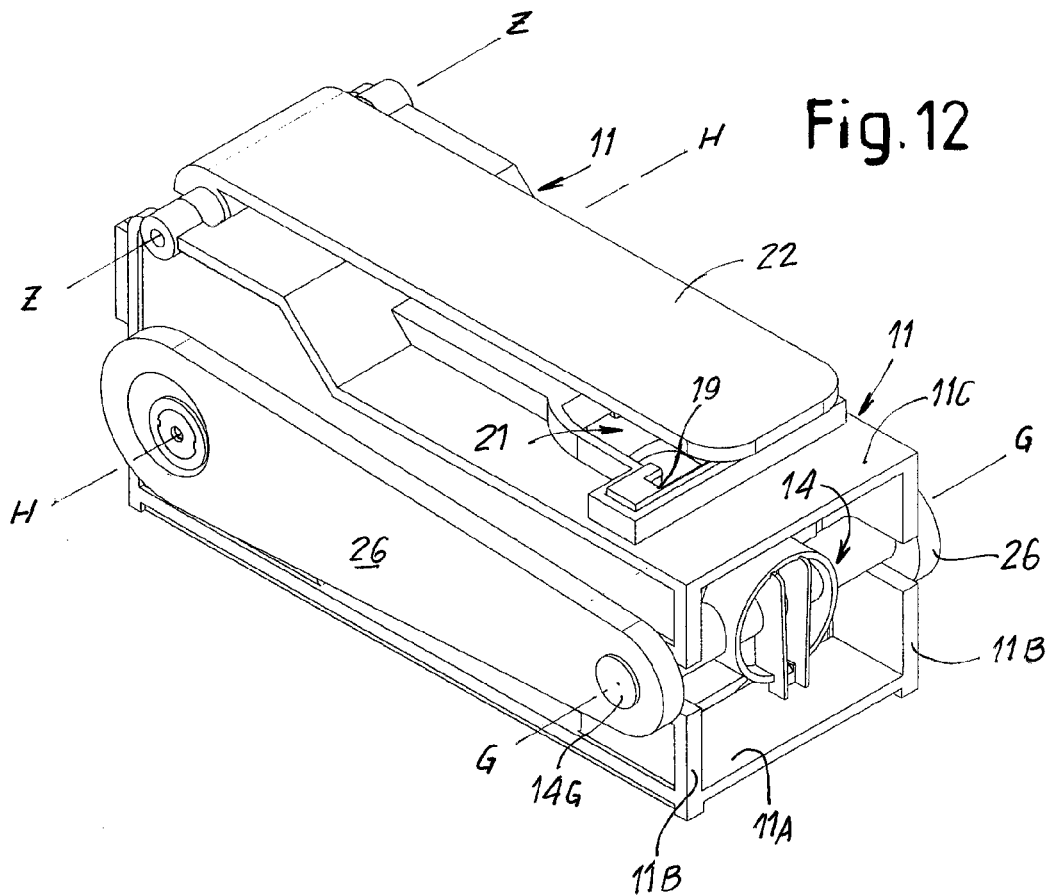
FIG. 12 shows a perspective view of the device according to the invention in a second embodiment.
Figure 13:
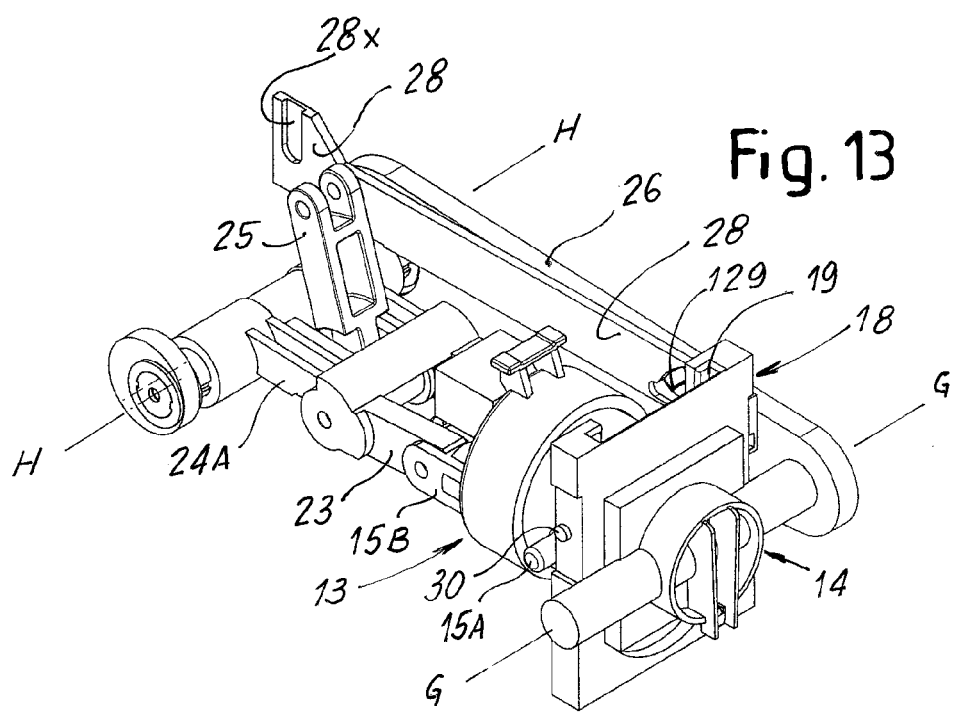
FIG. 13 shows a perspective view of the inner components of the device of FIG. 12.
Figure 14:
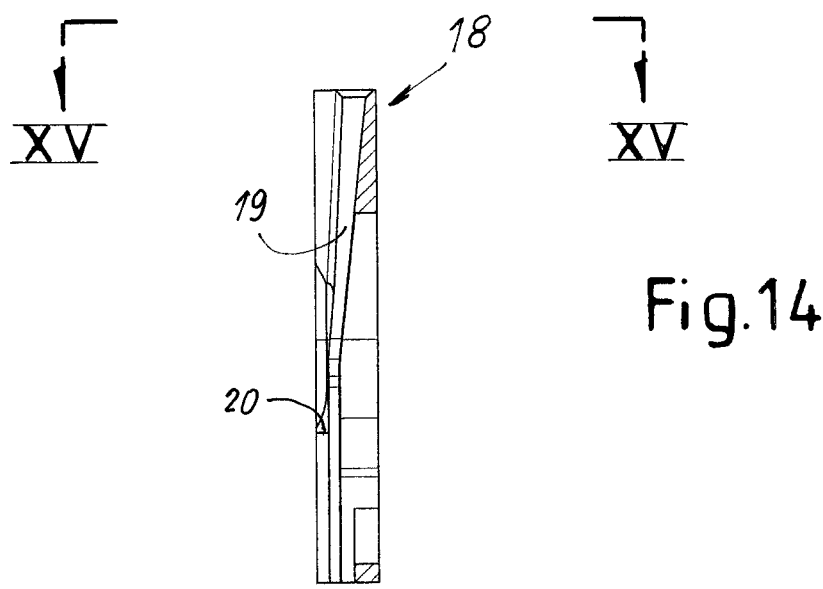
FIG. 14 shows a section according to XIV-XIV of FIG. 15 of the positioning member of the device of FIG. 12.
Figure 15:
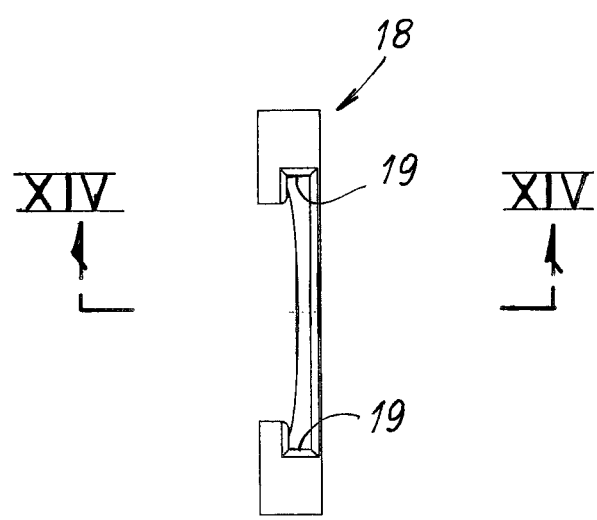
FIG. 15 shows a section according to XV-XV of FIG. 14.

The control lever 22 is then wholly rotated towards the frame, as shown in FIGS. 10a and 10b. The first chamber portion 13 and the second chamber portion 14 are translated towards the positioning member 18 in which the capsule C is positioned, to sealingly close the chamber, by introducing inside thereof the capsule. The piercing members pierce the two opposed faces of the capsule.

In the example shown, it is to be noted that in this position the crank 24A and the connecting rod 23 are almost aligned, with a misalignment of about 3° with mutual articulation point at a higher quote than the axis X. In this lowering step of lever 22, the pushing appendix bends the small flaps 28A of the slides 28, arranging at the ending face 28A' thereof. The slides 28 and consequently the positioning member 18 do not move during the lowering step of lever 22.

The capsule C has not moved with respect to the position defined by the abutment thereof against the projections 20. In the example shown, the first chamber portion 13 and the second chamber portion 14 are pressed one against the other in sealing engagement with the capsule C, while the outer annular area of the flange is still engaged in the guiding channels 19 of the positioning member 18 and abutting against the projections 20. Preferably both the first chamber portion 13 and the second chamber portion 14 partly enter in the volume defined by the structure of the positioning member 18, such that the front surfaces of both the first and the second chamber portions 13, 14 are positioned substantially in line with the guiding channels 19 or parts thereof. As a matter of fact, at least one and preferably both said movable first and second portion 13, 14 of the brewing chamber enter into the empty space surrounded by the positioning member 18.

In this step, with the lever 22 wholly lowered, the brewing takes place by flowing brewing water inside the capsule through supplying ducts 13B. The liquid extracted from the content of the capsule outgoes from the plate 14B through the holes 14C and subsequently through the outlet duct 14B and it is routed towards a dispensing area (not shown in the figures).

Once the dispensing, i.e. brewing of the beverage is ended, in order to discharge the just used capsule and to insert a new one, the control lever 22 is raised. In the example shown in the drawings for the first 26° of rotation thereof (FIG. 11a, 11b) the raising of the positioning member 18 takes place (thanks to the motion of the slides 28 controlled by the pushing appendix 22A) so that the projections 20 pass upwards, by deforming them locally, beyond the diametral ends of the flange of the capsule. This releases the flange C" of the capsule C from the projections 20. Preferably, the first and the second portions 13, 14 of the brewing chamber have not moved yet, such that the flange C" of the capsule is still forcedly retained between the opposing front surfaces of the first portion 13 and the second portion 14 of the brewing chamber. The capsule is retained in the brewing chamber and is prevented from falling down.

By continuing the rotation of the lever 22, the positioning member 18 remains in the raised position and the chamber portions 13 and 14 move away from the positioning member, by freeing the capsule which, then, is no more supported by anything and it is free to fall down towards an area for collecting exhausted capsules (not shown in figures). The elastic members 31 bring back the slides 28 by bringing downwards the positioning member 18 (FIGS. 8a and 8b), i.e. in the initial situation.

It should be understood that in some embodiments the moving apart of the first portion 13 and second portion 14 of the brewing chamber can at least partly overlap with the upwards movement of the positioning member 18, provided the capsule is still retained against a vertical lifting such that the flange C" thereof is safely released, due to the projections 20 moving upwards beyond the flange C", preferably by partly deforming the flange C".

Obviously the "horizontal" and "vertical" references used in the description are referred to the particular reference system of the given example, that is with the sliding axis X arranged horizontally like in the drawings. In the case wherein the device should be mounted with the non horizontal axis X, the references will vary consequently.

In some embodiments the axis X could be inclined over the horizontal and/or the direction of movement of the positioning member 18 and/or the orientation of the guiding channels 19 provided therein could be oriented differently than at 90° with respect to the axis X. In preferred embodiments, however, the orientation of the guiding channels 19 is such that the capsule enters the channels and reaches the brewing position P by gravity, without the need for any additional measure to be taken in order to place the capsule. The remaining members of the device are oriented with respect to the guiding channels 19 such as to be able to carry out the above described movements and functions.

It is further to be noted that the channels 19 of the positioning member 18 can be arranged even inclined with respect to the axis X (and not orthogonal thereto, like in the just described example), still maintaining the concept of keeping the capsule in a fixed position during the motion of the supporting members 20 in order to disengage the lower side of the channels (consider, for example, inclined guiding channels and a capsule with a flange which is inclined (not orthogonal) with respect to the axis of the capsule itself). In general, according to the invention, the axis of the capsule never changes its inclination and preferably it remains parallel to the sliding axis X.

The described structure of the device brings to clear advantages in terms of structural and operative simplification. In fact, with such structure the capsule is not moved any more during the various steps of brewing and preparation to the discharge (the chamber portions and the means supporting the capsule do move), thus avoiding the need for complex mechanisms for moving and supporting the capsule itself. Furthermore, the use of a positioning member of the capsule with compact shape, which moves according to a direction transversal to the axis of the frame allows reducing considerably the overall dimensions.

Independently from the just describe preferred device, the advantages implicit in the invention are reached even with a method for brewing a beverage from a capsule by means of a brewing device which comprises, considering what described above, a guiding step of the capsule C towards a brewing position P which fixed with respect to the frame 11 of the device, a step for supporting the capsule from the bottom in the brewing position P, a step for approaching from opposite directions of two portions of a brewing chamber 13 and 14 towards the brewing position P where the capsule is located and a subsequent step of sealingly closing the chamber.

Then brewing takes place by flowing the brewing liquid through the chamber with capsule therein and the brewed liquid is made to flow towards the dispensing or collecting area. Once ended the brewing step, the capsule is freed on the lower side, by allowing it to fall down directly from the brewing position.

In the specific case, the step for freeing the capsule to allow to fall downwards provides a step for moving upwards the supporting members 20 of the capsule from the brewing position P; during the motion of such supporting members 20, the capsule is still in the brewing position and the supporting members 20 deform the capsule portion which is near said members during the supporting step. Practically, such capsule portion results to be an obstacle for the motion upwards of the supporting members 20.

Embodiment of FIGS. 12-30

FIGS. 12-30 show a second, modified embodiment of a device according to the invention. Elements, parts or components of the embodiment shown in FIGS. 12-30 corresponding to elements, parts or components of the first embodiment shown in FIGS. 1-11 are labelled with the same reference numbers.

The second embodiment differs from the first embodiment mainly in respect of the following: the linkage between the actuating or control lever 22 and the brewing chamber; the shape of the first brewing chamber portion 13; the shape of the positioning member 18 and of the guiding channels 19 provided therein; the mechanism for actuating the lifting and lowering motion of the positioning member 18. These three parts of the brewing unit shown in FIGS. 12-30 will now be described individually. It should be understood that the features distinguishing one embodiment from the other could be variously combined to originate different possible combinations. For example, the different linkage between the actuating or control lever 22 and the movable brewing chamber portions disclosed in FIGS. 12-30 could be used also in the embodiment of FIGS. 1-11, all the remaining elements and components remaining unchanged. Similarly, the actuating lever and linkage of FIGS. 1-11 could be used in the embodiment of FIGS. 12-30 and/or the brewing chamber portion 13 shown in FIGS. 12-30 could be replaced in the embodiment of FIGS. 1-11 or vice versa and the mechanism for lifting and lowering of the positioning member of the second embodiment could be used in the first embodiment or vice versa.

Referring specifically to the linkage or mechanical connection connecting the control lever 22 to the moving brewing chamber portion 13, in the embodiment of FIGS. 12-30 the control lever 22 is connected to the rocker arm 24B by means of a connecting rod 25 similar to the connecting rod 25 of FIGS. 1-11. However, in the second embodiment the connecting rod 25 is hinged to a projection 22B of the control lever 22 located between the distal end thereof and the hinge axis Z.

Concerning the brewing chamber, according to the second embodiment the first brewing chamber portion 13 includes two sub-portions 13X and 13Y. The sub-portion 13X forms the inner receptacle 16 of the brewing chamber, in which the capsule C is housed during the brewing cycle. Said first sub-portion 13X is slidingly housed inside the outer sub-portion 13Y, which in turn is integral with the projection 15B connecting the brewing chamber portion 13 to the leverage actuated by control lever 22. A sealing gasket 13Z is arranged between the two sub-portions 13X, 13Y, said sealing gasket being provided to seal a variable-volume chamber 16X formed between the two sub-portions 13X, 13Y of brewing chamber portion 13. The two sub-portions 13X, 13Y form a sort of hydraulic cylinder-piston system in which the sub-portion 13X forms the piston and the sub-portion 13X forms the cylinder. Resilient members 16Y are arranged in chamber 16X between the two members 13X and 13Y.

The brewing liquid, e.g. hot pressurized water, fed through the supply duct 13B enters the variable-volume chamber 16X and the pressure generated therein causes the sub-portions 13X 13Y to move apart, to recover possible clearances during closure of the brewing chamber, as will be discussed in more detail here below. Resilient members 16Y ensure initial closure of the brewing chamber before the pressurized water starts filling chamber 16X even in case of manufacturing tolerances of the brewing device and/or of the capsule C.

The shape of the positioning member and of the guiding channels 19 (see FIGS. 14, 15, 16) are such that when the capsule C is in the brewing position P (FIG. 16), which is defined by the supporting members 20, the axis of said capsule is substantially parallel to the axis X defining the direction of reciprocal movement of the brewing chamber portions 13, 14. By "substantially parallel" a position is understood, which differs from an exactly parallel position only as a consequence of possible manufacturing tolerances of either the capsule or the elements forming the brewing device. This is achieved by designing the channels 19 slightly inclined with respect to a direction orthogonal to the axis X. The advantage of the above design is that the capsule C can enter the receptacle 16 more smoothly. Preferably, when the capsule is in the brewing position P, the axis thereof is substantially coincident with the axis X of the brewing chamber. The definition substantially coincident encompasses any position which differs from an exact coincidence of the two axes due to manufacturing tolerances of either the capsule or the brewing device, i.e. any unintentional misalignment.

The positioning member 18 is provided with a lifting and lowering motion imparted via the control lever 22 as in the previous embodiment. The movement from lever 22 to the positioning member 18, however, is transmitted with a different mechanism, which allows a better control of the movement of said positioning member 18 and a simplified structure of the entire brewing device. The control lever 22 is again provided with opposed projections 22' provided at the distal ends thereof with two pushing appendices 22A. Said appendices 22A engage into respective slots 28X provided near a first end of respective elongated slides 28. Slots 28X and appendices 22A form respective cam-follower arrangements for actuating the slides 28. Each slide 28 is slidingly engaged in a corresponding guide of the respective longitudinal side wall 11B of frame 11. The rotation of the control lever 22 about the hinge axis Z causes the appendices 22A to move along a circular trajectory and in the respective slots 28X. As a consequence of said movement, the slides 28 are slidingly moved parallel to axis X. The movement of the sliders 28 is therefore controlled in a positive manner in both directions along axis X by the cam-follower 28X, 22A, avoiding the need for resilient return members such as the springs 31 provided in the embodiment shown in FIGS. 1-11.

At the ends opposite slot 28X, each slide 28 is provided with a control cam 129, having a similar function as cam 29 in FIGS. 1-11. However, the shape of the control cams 129 substantially differs from cams 29 and provides a better control of the positioning member 18. The shape of one cam 129 is clearly shown e.g. in FIG. 18, the opposite cam 129 being symmetrical. The cam 129 defines a closed or loop path with a lower substantially rectilinear portion and an upper portion in the form of an arch. A pin 30, integral to the positioning member 18 is provided on each side of said positioning member 18. Each pin 30 engages in the respective cam 129 and acts as a cam follower. The relative movement between cam 129 and pin 30 causes the positioning member 18 to move up and down, as will be described later on in more detail. Each pin 30 moves, as a consequence of the motion of the lever 22, along a closed trajectory defined by the loop-shaped cam 129. Elastic flaps 129X, 129Y are provided in each cam 129, such that the respective pin 30 is forced to follow a precise closed trajectory within cam 129, as will be described in more detail here below.

Figure 18:
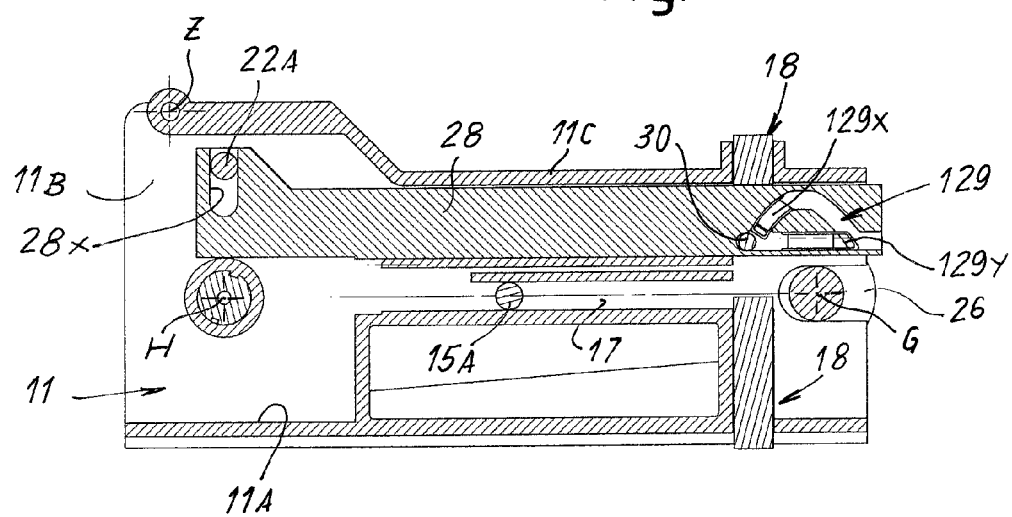
FIG. 18 shows a cross section along line XVIII-XVIII of FIG. 17.
Figure 28:
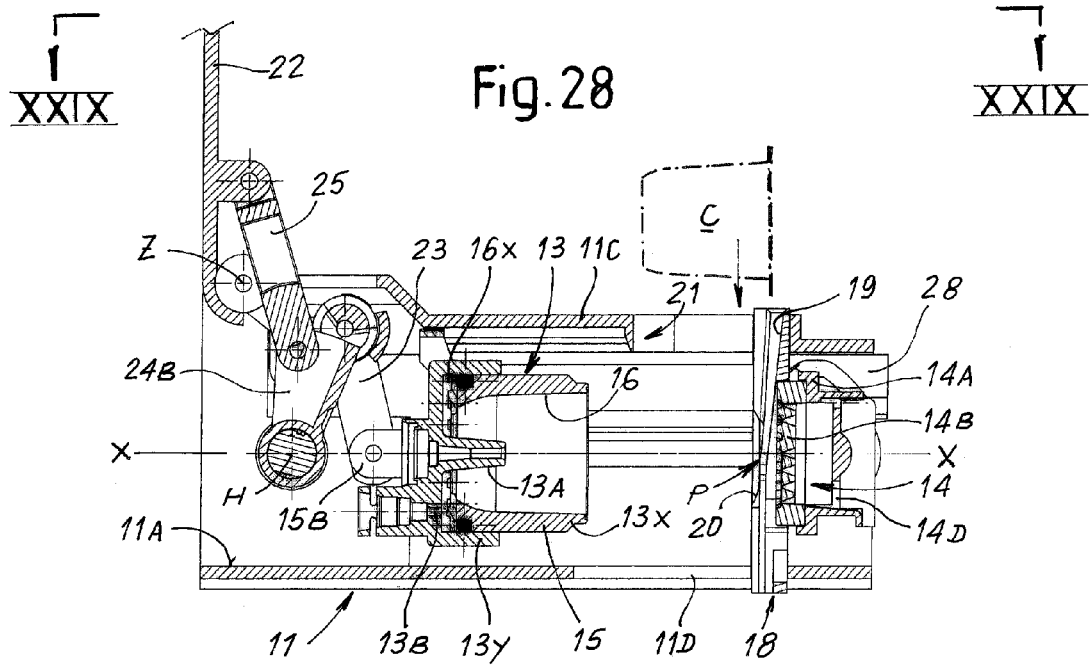
Figure 29:
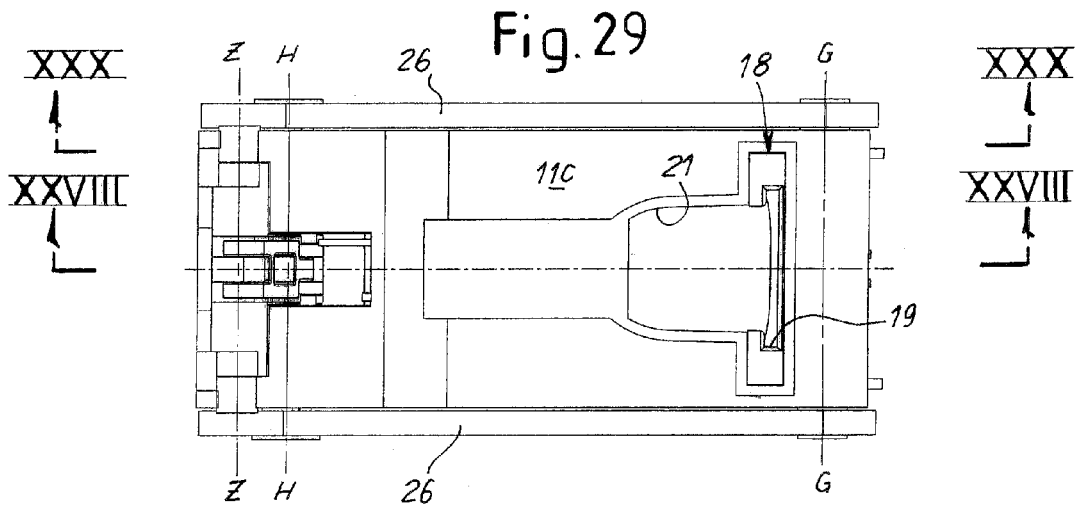
Figure 30:
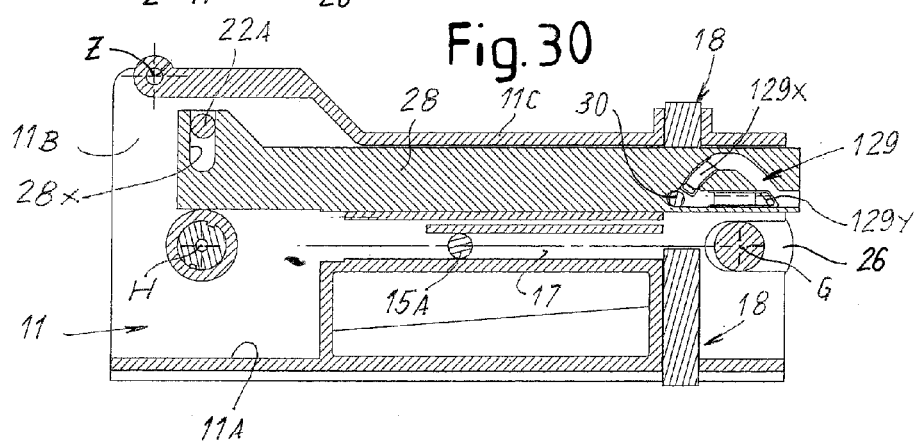

The brewing cycle is performed as follows. Starting from FIGS. 16-18, when the brewing chamber is entirely open, with the portions 13, 14 completely spaced apart and the control lever 22 in the fully raised position, a new capsule C can be dropped into the device through the insertion area 21. The flange C″ of the capsule C engages the channels 19 of the positioning member 18. Said positioning member 18 is in its lower position. The pins are located in a recess in the lowest portion of the cams 129, as shown in FIG. 18.

Figure 16:
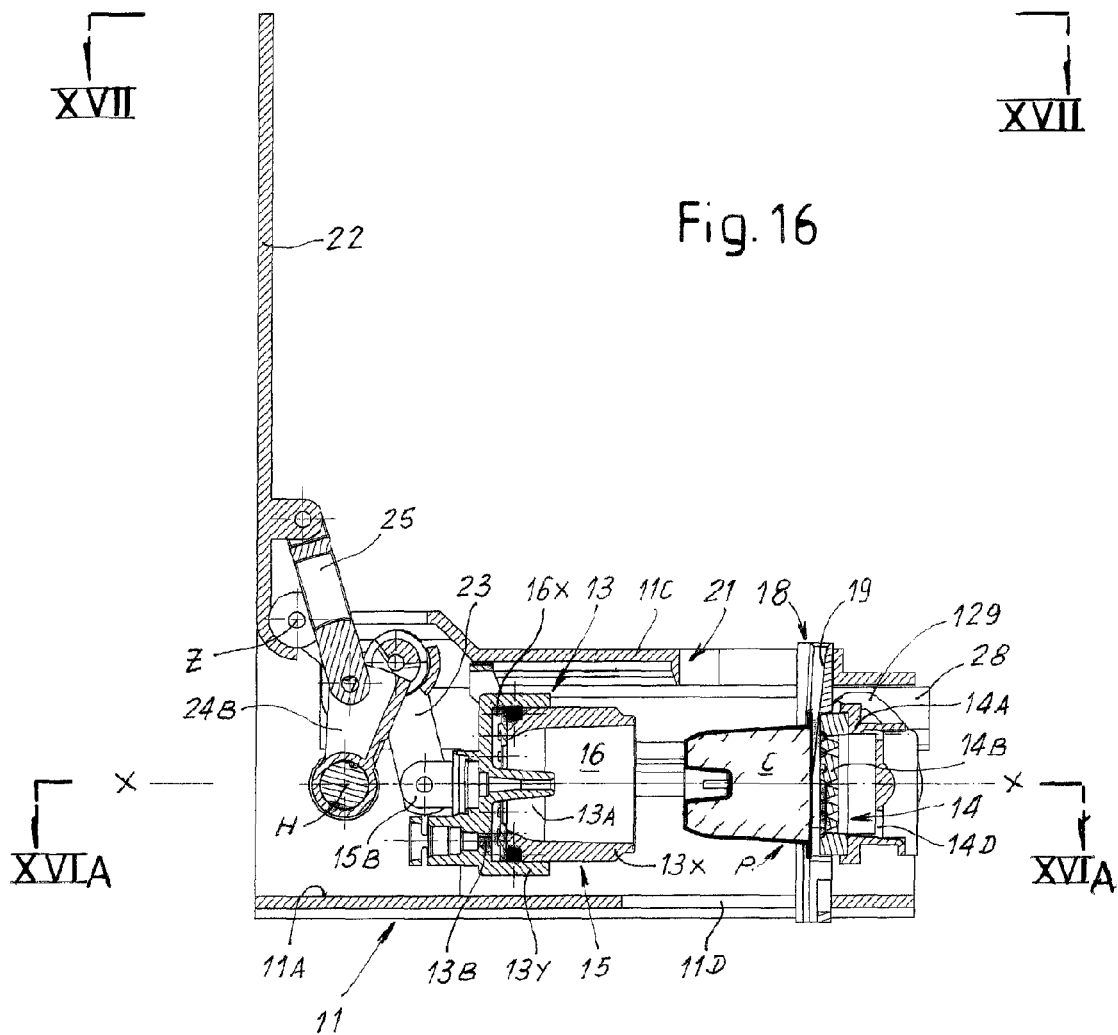
FIG. 16 shows a cross section along line XVI-XVI of FIG. 17 of the device of FIG. 12 in a starting position, with the actuating lever in the raised position.
Figure 16A:
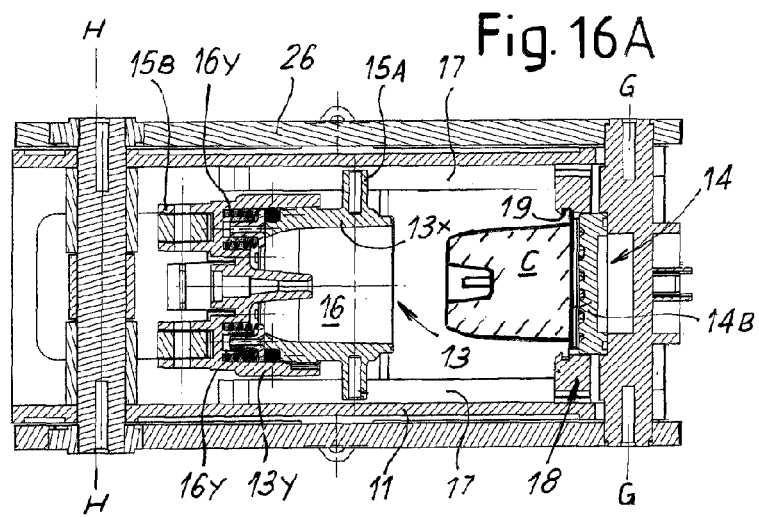
FIG. 16A shows a cross-section along line $XVI_A$-$XVI_A$ of FIG. 16.
Figure 17:
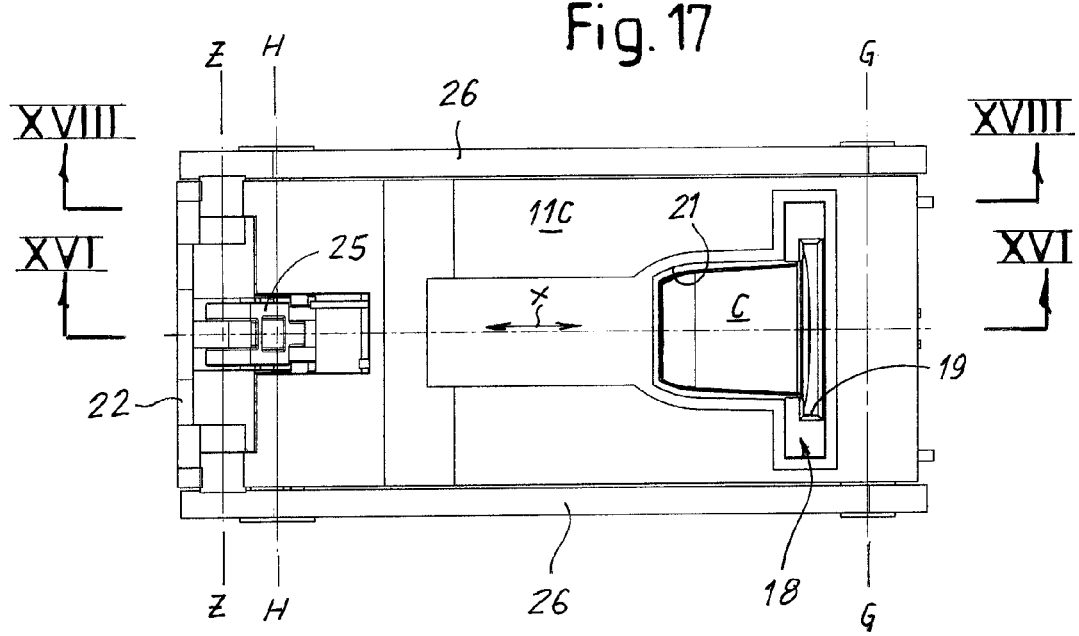
FIG. 17 shows a plan view according to line XVII-XVII of FIG. 16.

FIG. 16 also shows the position achieved by the capsule C once it has been dropped along the guiding channels 19. The flange C″ of the capsule abuts against projections 20 provided along the channels 19. The axis of the capsule C is substantially parallel to the axis X. As discussed in connection with the previous example, the capsule C will not be moved from the brewing position P during the entire brewing cycle.

To start the brewing cycle the brewing chamber must be closed by rotating the control lever 22 about axis Z. In FIGS. 19-21 the brewing device is in the closed position. The control lever 22 has been rotated from the substantially vertical starting position (FIG. 12) by about 90° and is substantially horizontal. The two brewing chamber portions 13, 14 have moved one towards the other and against the flange C″ of the capsule C. The capsule C remains in the same position P as in FIGS. 16-18. The plate 14B presses against the circular edge of the inner sub-portion 13X of the brewing chamber portion 13, the flange C″ being trapped therebetween. The brewing cycle can start. During the closing movement the pins 30 of the positioning member 18 slide along the rectilinear lower portion of the respective cams 129. They are prevented from accidentally entering the arcuate upper portion of said cams by the elastic flaps 129X.

It should be understood that the starting position and the end position of the lever 22 could be different from vertical and horizontal, respectively.

Once the brewing chamber 13, 14 is closed, pressurized hot water is fed through the supply duct 13B. If for any reason some clearance remains between the two portions 13, 14 of the brewing chamber, said clearance is recovered by the movement of the sub-portion 13X of the brewing chamber with respect to the sub-portion 13Y of the brewing chamber. Said movement is hydraulically actuated thanks to the hot pressurized water entering the variable volume 16X and due to the counter-pressure generated by the capsule C. Once said volume has been expanded and any possible clearance recovered, water can flow into receptacle 16 and through the capsule C. As noted the top and/or bottom surfaces of the capsule C can be apertured. Alternatively one or both said surfaces can be sealed. The sealed surface can be pierced by suitable piercers (not shown), as known to those skilled in the art. A piercer is understood to be any member capable of causing rupture of the capsule due to mechanical or hydraulic or combined hydraulic/mechanical action.

After brewing has been completed, the brewing chamber 13, 14 must be opened and the spent capsule C discharged by rotating again the control lever 22 about axis Z from the horizontal position to the vertical position. A first rotation of the control lever 22 towards the open position (see FIGS. 22-24) causes an upwards movement of the positioning member 18 in order to disengage the capsule from the supporting members formed by the projections 20. During the rotation of the lever from the position of FIGS. 18-21 to the position of FIGS. 22-24, the appendices 22A slide in the slots 28X such as to cause retraction of the slides 28. During said retraction motion the cams 129 co-act with the pins 30 of the positioning member 18 such as to cause an upward movement thereof. Said upward movement is controlled by the arcuate upper portion of the cams 129. The pins 30 are forced to enter said arcuate portion of the cams 129 and to travel towards the top vertex thereof (see FIG. 24). Elastic flaps 129Y prevent the pins 30 from following the rectilinear path defined by the lower portion of the cams 129 and force said pins 30 to enter and move along the arcuate portion of the cams.

As described in detail in connection with the previous embodiment, the lifting movement of the positioning member 18 causes the projections 20 to pass beyond the flange C″ of the capsule C by slightly deforming said flange, the diameter of which is larger than the distance between the projections 20. During this movement the capsule still remains in its original position P, since the brewing chamber 13, 14 is still closed. The linkage connecting the control lever 22 to the brewing chamber portions 13, 14 is designed such that during the first upwards movement of the control lever 22 the brewing chamber is maintained in the closed position.

A further rotation of the control lever 22 (see FIGS. 25-27) causes opening of the brewing chamber 13, 14 and lowering of the positioning member 18. During this rotation of the control lever 22 the pins 30 of the positioning member 18 are forced to move along the arcuate portion of the cams 129 from the top vertex thereof towards the lower rectilinear portion of the cams. The positioning member 18 is thus forced to move downwards towards its starting position. The capsule C has been released from the supporting members 20, such that once the brewing chamber 13, 14 opens, the capsule is not supported anymore and falls downwards towards a collecting tray (not shown), arranged underneath an aperture 11D provided in the bottom 11A of frame 11.

FIGS. 28-30 show again the position of the brewing device after discharge of the spent capsule.

Figure 31:
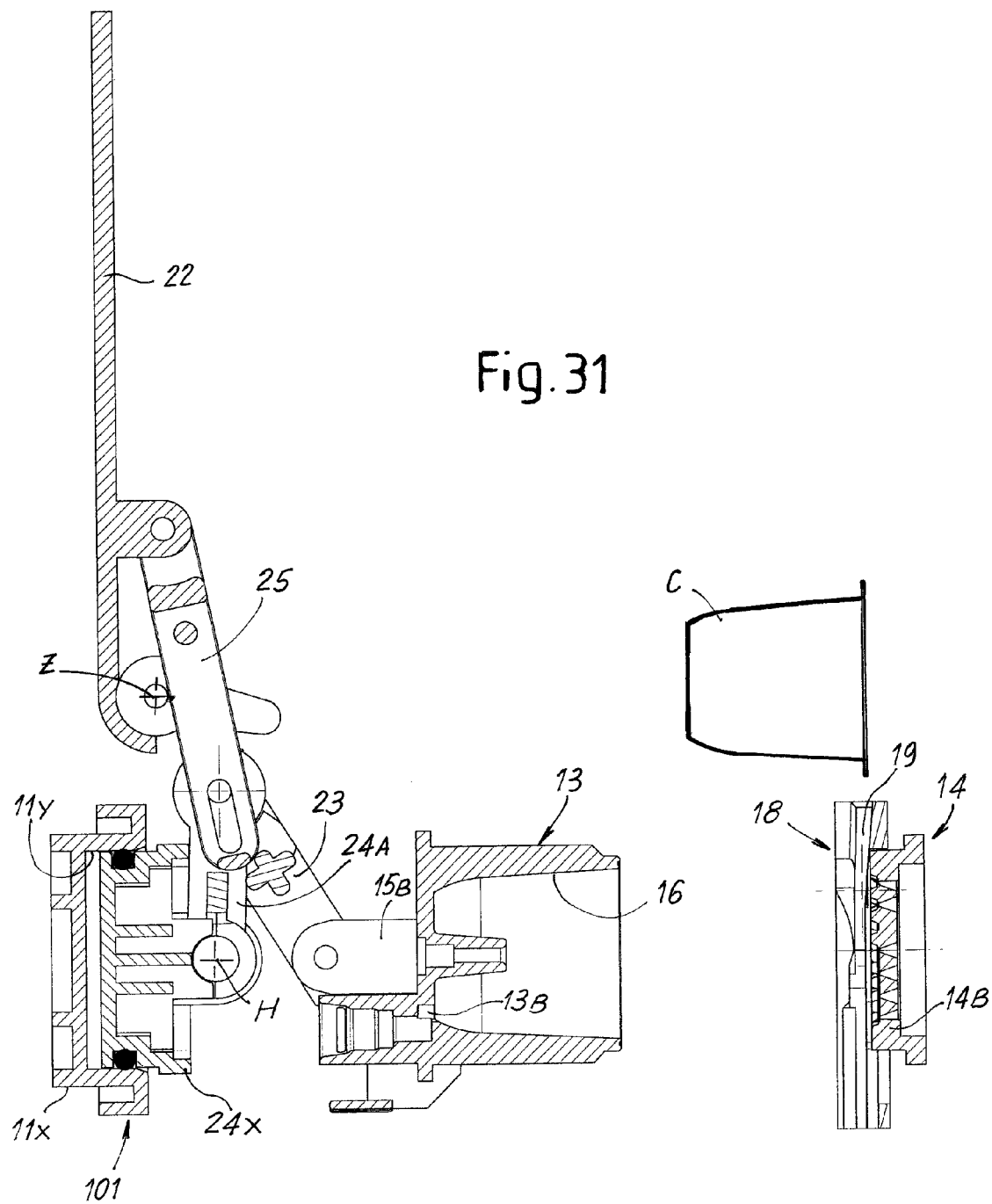
FIGS. 31 and 32 show sections of a third embodiment of the device according to the invention, respectively in an open position and a closed position.
Figure 32:
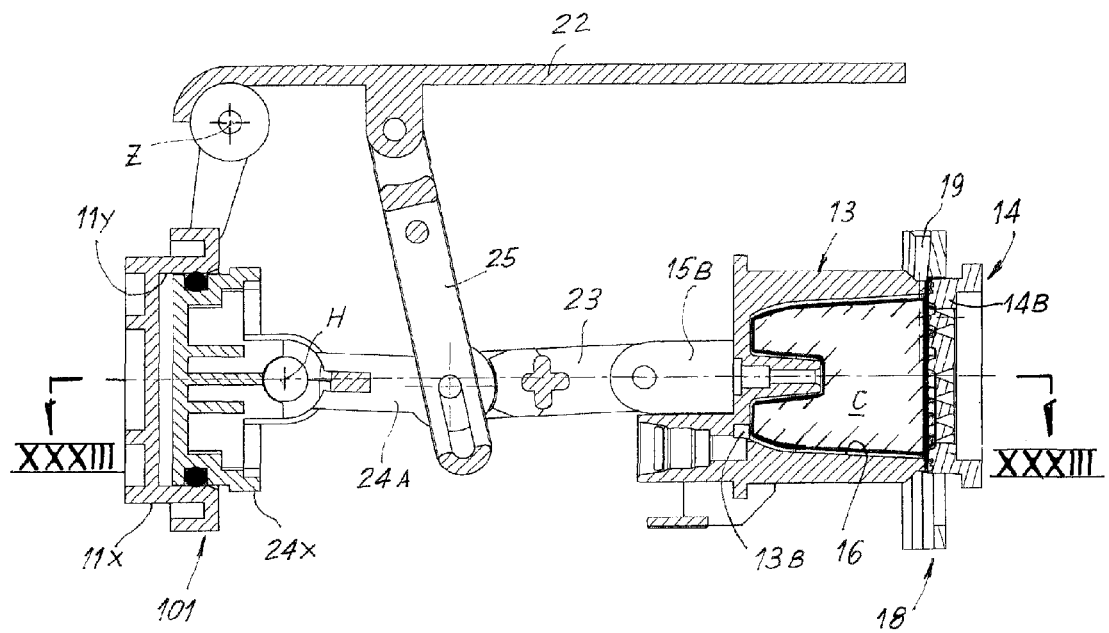
Figure 33:
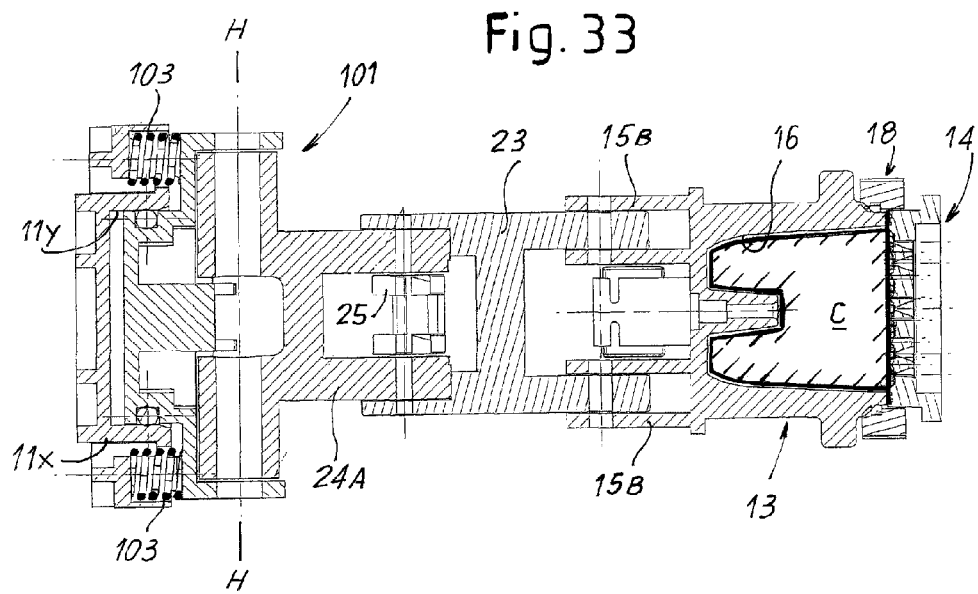
FIG. 33 is a cross-section according to line XXXIII-XXXIII of FIG. 32.

Embodiment of FIGS. 31-33

A third embodiment of a device according to the invention is shown in FIGS. 31-33. In these figures only some elements of the brewing device are shown, for the sake of illustration of the differences between the third embodiment and the first and second embodiment described here above. The same reference numbers are used to designate the same or corresponding elements, parts and components of the brewing device.

In the embodiment of FIGS. 31-33 a hydraulic cylinder-piston unit 101 is arranged between crank 24A and a fixed part of the frame 11, labelled 11X. The fixed part 11X of the frame 11 forms a cylinder 11Y into which a piston 24X slides. The piston 24X is pivotally connected to crank 24A. A pressurized water-supply line (not shown) is connected to the chamber of cylinder 11Y. Preferably, the water supplied to the cylinder 11Y is pressurized by the same pump which feeds the brewing water to the brewing chamber, but is not heated. This can be achieved e.g. by providing two pressurized water ducts. The first duct connects the pump to a boiler the second duct connects the pump directly to the cylinder 11Y.

In the closed position (FIG. 32) of the device the pressurized water fed into cylinder 11Y. The water pressure compensates possible manufacturing tolerances of the capsule or the brewing devices, such that a reliable closure of the brewing chamber is always ensured. Resilient members, such a helical compression springs 103, are arranged between a fixed portion of the frame 11 and the piston 24X. The resilient members 103 compensate possible manufacturing tolerances and ensure closing of the brewing chamber even before the pump of the hydraulic circuit starts pumping pressurized water in the brewing chamber and in the cylinder-piston unit 101.

Embodiments of FIGS. 34-40

Figure 34:
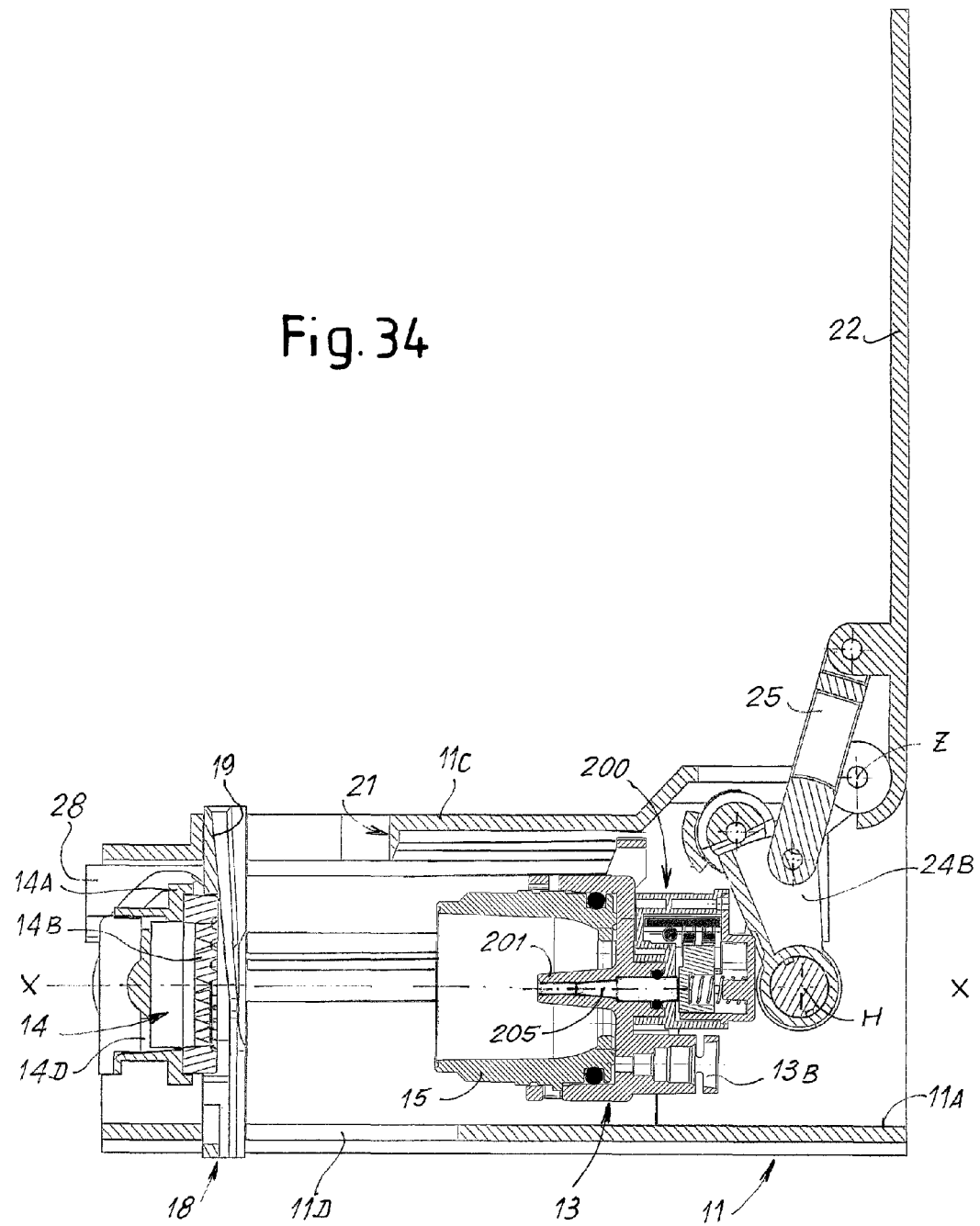
FIG. 34 shows a section of a brewing device similar to the device of FIGS. 19-30, on which a capsule-identifier system is implemented.

FIG. 34 shows a longitudinal section of a brewing device similar to the device shown in FIGS. 12-30. The same reference numbers are used to designate corresponding parts, elements or components as in FIGS. 12-30. Common features will not be described again. The brewing device of FIG. 34 comprises a capsule identifier system, designated 200 as a whole. The same capsule identifier system 200 can be used also in the other embodiments of the brewing device described herein with reference to FIGS. 1-11 and 31-33.

Figure 35:
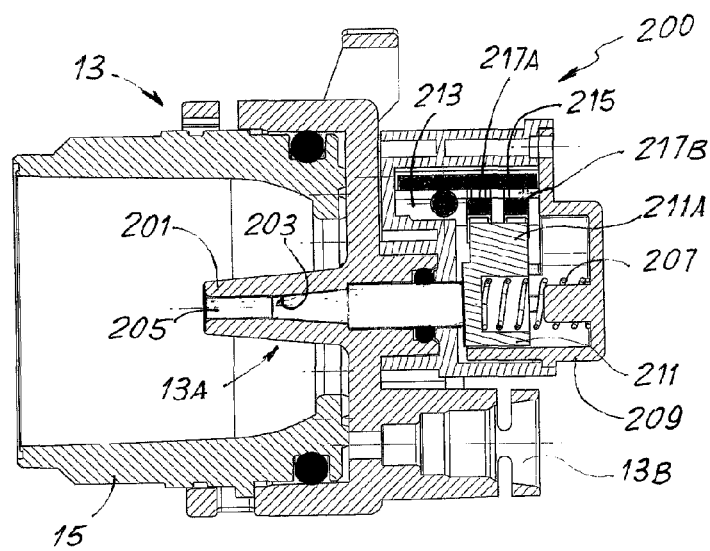
FIGS. 35, 36, 37 show a section of one embodiment of the capsule-identifier system in three different operative conditions.
Figure 36:
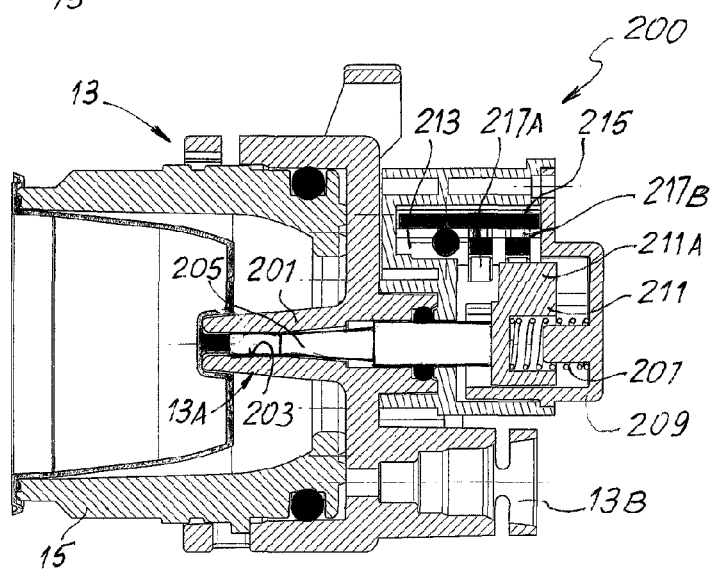
Figure 37:
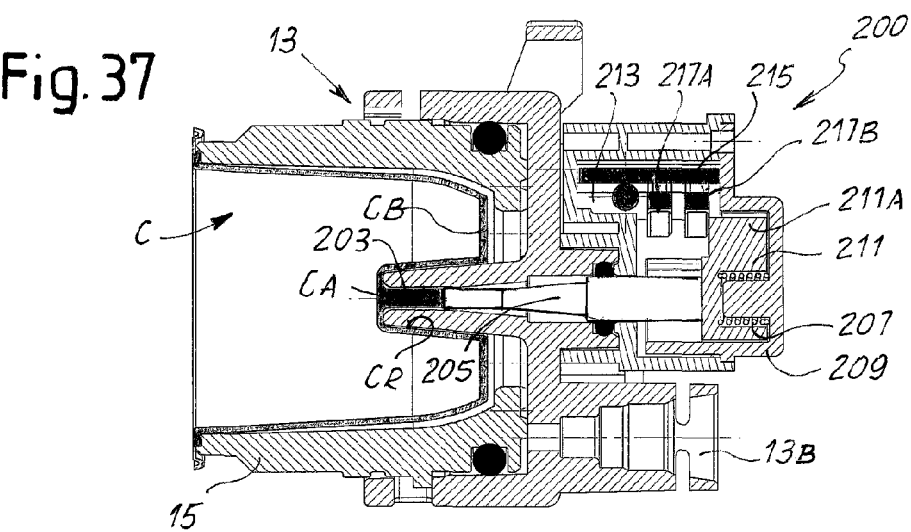

Two alternative embodiments of the capsule identifier system 200 will be described in detail here below, reference being made to FIGS. 35-40. The embodiment illustrated in FIGS. 35-37 is the one shown in the brewing device of FIG. 34.

Referring first to FIGS. 34-37, the capsule identifier system 200 is supported by the first chamber portion 13 of brewing device 10. More specifically, the capsule identifier system 200 is arranged behind the capsule identifier 13A extending from the bottom of the first chamber portion 13. In some embodiments the capsule identifier comprises a frustum-shaped projection 201 extending from the bottom of the first brewing chamber portion 13 towards the opposite second brewing chamber portion 14. In some embodiments the projection 201 is internally hollow and forms a sliding seat 203 for a capsule identification slider 205. In the drawings the sliding seat 203 and the capsule identification slider 205 are conically shaped. However both said components can be differently shaped, e.g. they can be cylindrical or prismatic. The capsule identification slider 205 is resiliently biased by a resilient member 207 towards a rest position illustrated in FIG. 35. In the embodiment shown the resilient member 207 is a helical spring, but other suitable resilient members can be used, such as e.g. laminar springs, Belleville springs, or the like. The resilient member 207 is arranged between a cover 209 and a pusher 211 co-acting with the capsule identification slider 205. The pusher 211 be integral with or constrained to the capsule identification slider 205; alternatively it can be simply arranged between the capsule identification slider 205 and the resilient member 207 and resiliently biased against the former.

In the embodiment illustrated in the drawing the length of the capsule identification slider 205 is such that in the rest position (FIG. 35) the distal end thereof, i.e. the end opposite the biasing member 207, is substantially flush with the end of projection 201.

The cover 209 closes a housing 213 supported on the back of the brewing chamber portion 13 in which the capsule identification slider 205 is partly housed and from which said capsule identification slider 205 projects into the sliding seat 203. The housing 213 contains an electronic card 215 on which two sensors 217A, 217B are arranged. In some embodiments the sensors 217A, 217B are optical sensors, each comprising an optical emitter and an optical receiver. The two sensors 217A, 217B cooperate with a projection 211A integrally moving with the capsule identification slider 205. In some embodiments the projection 211A is formed on the pusher 211. The signals generated by the sensors 217A, 217B are processed by the control unit of the brewing device for the purposes set forth below.

In the position illustrated in FIG. 35 the projection 211A is placed in front of both sensors 217A, 217B. If the latter are in the form of optical sensors, in the position of FIG. 35 the projection 211A is placed between the two emitters and the two receivers of both sensors, thus preventing light emitted by the emitters to be detected by the receivers.

The movement of the capsule identification slider 205 is caused by interaction thereof with a capsule. The capsules C are shaped accordingly. FIGS. 36 and 37 illustrate the brewing chamber portion 13 with a capsule C housed therein, in the position taken by the capsule when the brewing chamber is closed. As can be seen in FIGS. 36 and 37, the capsule has a bottom CB with a recess CR. The shape of the recess preferably corresponds to the shape of the projection 201. An appendix CA projects from the bottom of the recess CR towards the capsule bottom CB. The shape of the appendix CA is such that the appendix CA can penetrate the sliding seat 203 where the capsule identification slider 205 is slidingly arranged.

If no capsule is introduced in the brewing chamber, when the latter is closed the position of the capsule identification slider 205 with respect to the sensors 217A, 217B will not change. The absence of light detection by both sensors 217A, 217B will be interpreted by the control unit as either "brewing chamber open" or "capsule C absent". Since the position of the brewing chamber can be detected by suitably arranged micro-switches or the like, the central control unit will thus be capable of detecting a condition of closed brewing chamber and absence of a (suitable) capsule. If a wrong capsule is used, it will not interact with the capsule identification slider and will therefore cause a signal of "capsule absent".

If a capsule C suitable for the brewing device, i.e. provided with a correctly shaped recess CR, is introduced in the brewing chamber, once the latter is closed the capsule C will be pushed towards the bottom of the brewing chamber portion 13, such that the appendix CA penetrates into the sliding seat 203 thus pushing the capsule identification slider 205 towards the interior of the sliding seat 203 against the spring force exerted by the resilient member 207. The movement performed by the capsule identification slider 205 depends upon the length of the appendix CA. In FIGS. 36 and 37 two different capsules C are shown: the difference between the capsules is given by the length of the appendix CA. The capsule shown in FIG. 36 has a shorter appendix CA than the capsule shown in FIG. 37. In the example shown also the body of the two capsules is different, the capsule of FIG. 36 being smaller than the capsule of FIG. 37. This, whoever, is not mandatory.

The length of the appendages CA are chosen such that the short appendix (FIG. 36) causes the capsule identification slider 205 to move the projection 211A such as to withdraw from sensor 217A but not from sensor 217B. The long appendix (FIG. 37), conversely, causes the capsule identification slider 205 to move the projection 211A to such an extent that it will be withdrawn from both sensors 217A and 217B. Different signals will thus be generated depending on the kind of capsule C introduced in the brewing chamber. The central control unit of the beverage producing machine in which the brewing device is arranged receives thus sufficient information to recognize whether a capsule has been correctly introduced in the brewing chamber and which capsule is used.

The same concept can be extended to discriminate between a number of different capsules larger than two. This can simply be done by providing a suitable length of the appendages CA and of the capsule identification slider 205 and a sufficiently large number of sensors 217A, 217B, capable of distinguishing among a corresponding number of different capsules.

According to a different embodiment, not shown, different kinds of sensors can be used in combination with or as an alternative to the optical sensors 217A, 217B, e.g. capacitive sensors. In some embodiments sensors of different nature can be used to distinguish among a larger number of possible alternative capsules, e.g. by providing appendages CA of variable length and variable material, which can be distinguished from one another optically or electrically.

Figure 38:
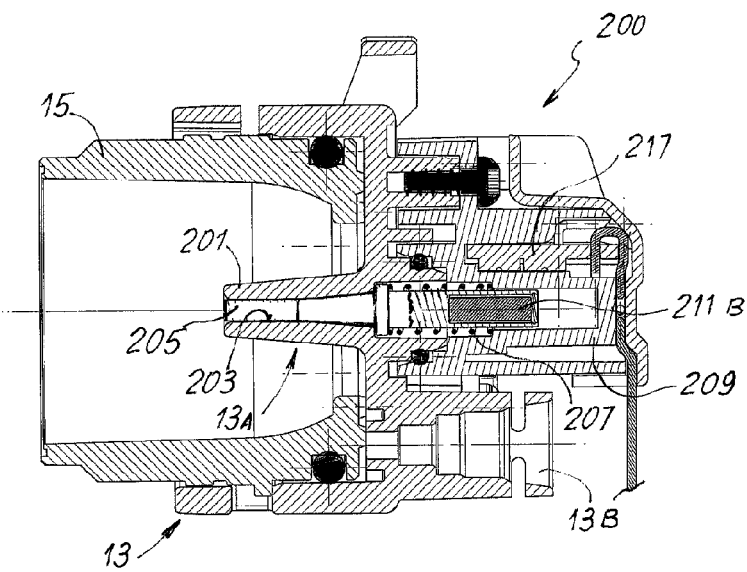
FIGS. 38, 39 and 40 show a section of a further embodiment of the capsule-identifier system in three different operative conditions.
Figure 39:
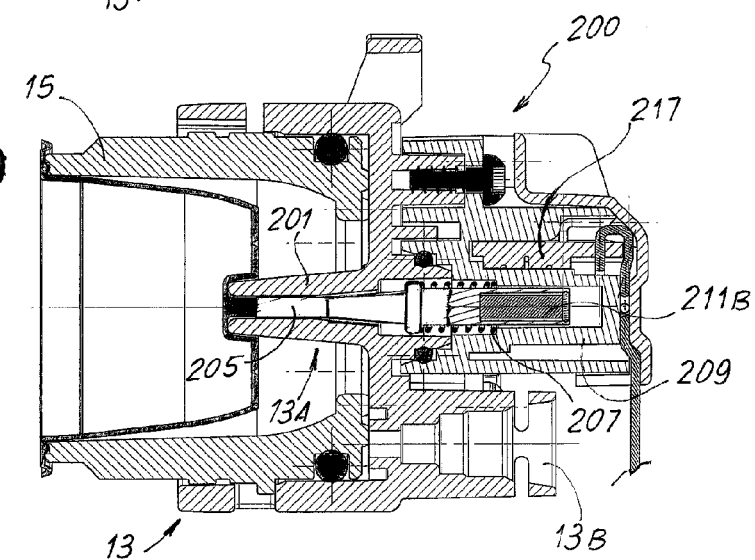
Figure 40:
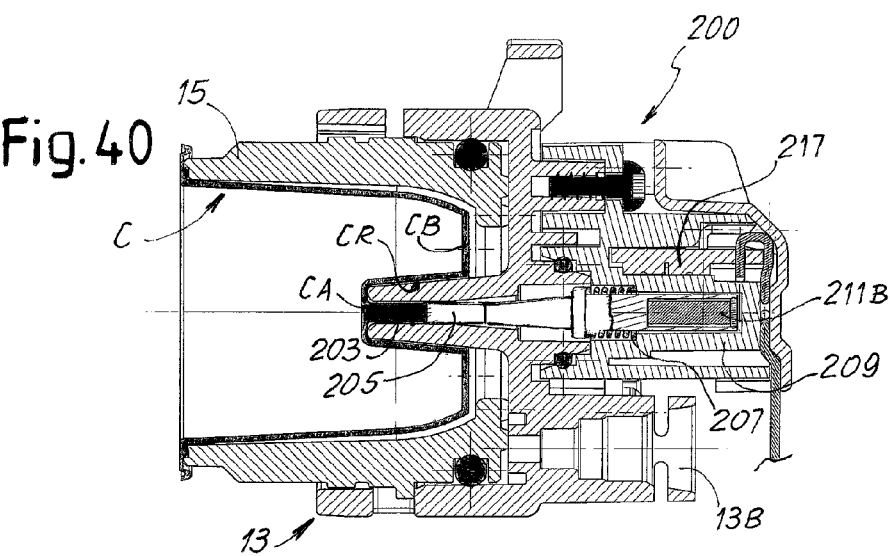

FIGS. 38 to 40 show a different embodiment of the capsule identifier system 200. The same reference numbers are used to designate the same or corresponding parts as in FIGS. 35 to 37. The capsule identification slider 205 is provided with a ferromagnetic or magnetic insert 211B. In some embodiments the insert 211B can be arranged in an axial seat provided in the back of the capsule identification slider 205. The insert 211B co-acts with a magnetic sensor or an arrangement of magnetic sensors 217 suitably housed adjacent the sliding seat of the capsule identification slider 205.

The position of the capsule identification slider 205 depends upon the presence or absence of a capsule and upon the kind of capsule used as previously described. FIG. 38 shows a situation where no capsule is present, FIG. 39 shows the position taken by the capsule identification slider 205 when a capsule with a short appendix CA introduced in the brewing chamber and FIG. 40 shows the position of the capsule identification slider 205 in case a capsule with a longer appendix CA is used. The position of the capsule identification slider 205 is detected by the magnetic sensor(s) 217 and a corresponding signal is generated and provided to the central control unit.

The capsule identifier system 200 enables several functions to be performed. For example, the signal generated by the sensors of the capsule identifier system can be used to detect whether the brewing chamber is empty before performing a de-scaling, washing or pre-heating cycle. The use of different capsules provided with appendages CA of variable length provides the possibility for automatically setting brewing parameters suitable for the kind of capsule used. For example, fresh brew coffee (America coffee) capsules and espresso capsules can be used alternatively, which require different water pressures. The pump of the machine can be automatically set for a given pressure depending upon the kind of capsule introduced in the machine. Alternatively, capsules requiring different brewing temperatures, and/or different pumping rates or different water amounts per brewing cycle can be used, again allowing automatic setting of the brewing parameters.

In general, the capsule identifier system is capable of discriminating between at least two different kinds of capsules and to set at least one brewing parameter depending upon the capsule used.

As noted above, the capsule identifier system described can be used in combination with any one of the embodiments of the brewing device. In general, the capsule identifier system comprises a mechanical member coacting with a capsule in the brewing chamber. The capsule is shaped such that upon closure of the brewing chamber the mechanical member is moved to an extent depending upon the shape of the capsule and interacts with a sensor arrangement to generate a signal. The signal is a function of the kind of capsule, i.e. of the shape thereof.

In some embodiments said capsule identification system comprises: a capsule identification member (in the embodiments disclosed here before a slider 205) penetrating in said brewing chamber and co-acting with an appendix provided on a capsule in said brewing chamber. The capsule identification member is preferably arranged in a sliding seat projecting in the brewing chamber from a bottom wall thereof, such that the capsule identification member is protected against accidental stresses due e.g. to incorrectly introduced capsules. In some embodiments the capsule identification member is resiliently biased in a rest position by a resilient member. In preferred embodiments the rest position is the one in which the capsule identification member is projecting in the brewing chamber to the maximum extent. Different kinds of capsules provided with different shapes, cause different retraction strokes of the capsule identification member. The position of the capsule identification member can be detected by one or more sensors arranged e.g. along the movement path of the capsule identification member.

According to some embodiments the capsule has a bottom, a recess in said bottom, an appendix projecting from the end wall of said recess towards the bottom of the capsule. The length of the appendix determines the kind of capsule. The appendix acts upon the capsule identification member and causes a movement thereof, the extension of which depends upon the length of the appendix.

The invention also refers to a system comprising a brewing device as above described and a capsule, said capsule provided with means interacting with the capsule identification member to cause said capsule identification member to take a position which is dependent upon the kind of capsule used. A brewing method can thus be performed with a brewing unit according to the invention and a capsule as above described, wherein a capsule is introduced in the brewing chamber, the brewing chamber is closed and at least one brewing parameter is selected based upon the interaction of the capsule, e.g. the appendix thereof, and the capsule identification member.

It is understood that what is illustrated represents only possible not limitative embodiments of the invention, which can vary in the shapes and arrangements without departing from the scope of the concept underlying the invention. The possible presence of reference numbers in the enclosed claims aims only at facilitating the reading thereof in the light of the previous description and the enclosed drawings and it does not limit in any way the scope of protection.

The invention claimed is:

1. A brewing device for preparing a food product, from a capsule, comprising:
    a frame having an insertion area for the capsule, the capsule being insertable in the insertion area towards a brewing position fixed with respect to the frame, wherein the frame comprises two side walls, each side wall comprising a longitudinal guide disposed in the side wall;
    a brewing chamber comprising a first chamber and a second chamber movably arranged in the frame, the first and second chambers being movable both one with respect to the other and with respect to the frame between a closed position and an open position,
        wherein the first chamber and the second chamber are configured to move different distances with respect to each other and with respect to the frame, when the first chamber and the second chamber move between the closed position and the open position, the first chamber being configured to move a first distance by a first pair of cursors slidingly arranged in the longitudinal guides and the second chamber being configured to move a second distance by a second pair of cursors slidingly arranged in the longitudinal guides, wherein the first distance is different from the second distance;

ducts configured to supply a brewing fluid to the brewing chamber and to dispense a brewed product from the brewing chamber;
a pair of opposed guiding channels configured to guide the capsule towards the brewing position fixed with respect to the frame, when the capsule is inserted in the insertion area; and
a capsule supporting member in the pair of opposed guiding channels configured to support the capsule in the brewing position fixed with respect to the frame by engaging a capsule portion during a supporting position of the capsule supporting member,
wherein the capsule supporting member is further configured to disengage the capsule from the supporting position and to release the capsule into a releasing position, disengaged from the capsule supporting member, after a completion of a brewing cycle prior to opening the brewing chamber by deforming the capsule portion after the completion of the brewing cycle prior to the opening of the brewing chamber.

2. The brewing device according to claim 1, wherein the first chamber and the second chamber are slidingly arranged in a sliding area of the frame.

3. The brewing device according to claim 2, wherein the first chamber and the second chamber are movable along a sliding direction substantially orthogonal to a capsule insertion direction, the sliding direction being substantially parallel to an axis of the capsule when the capsule is in the brewing position.

4. The brewing device according to claim 1, wherein an axis of the capsule in the brewing position is substantially coincident with an axis of the brewing chamber in the open position and in the closed position.

5. The brewing device according to claim 1, wherein the pair of opposed guiding channels are configured to engage a flange of the capsule.

6. The brewing device according to claim 1, wherein the pair of opposed guiding channels is configured between the first chamber and the second chamber when the first chamber and the second chamber are in the open position.

7. The brewing device according to claim 1, wherein the capsule supporting member is configured to support the capsule from a bottom opposite the insertion area.

8. The brewing device according to claim 7, wherein during a lifting movement of the capsule supporting member between the supporting position and the releasing position, the capsule is maintained in the brewing position fixed with respect to the frame.

9. The brewing device according to claim 8, wherein after the lifting movement of the supporting member to the releasing position and the brewing chamber is moved to the open position, the capsule, being no longer supported by one of the supporting member, the first chamber and the second chamber, falls from the brewing position.

10. The brewing device according to claim 7, wherein the capsule supporting member is configured to move to the releasing position by an upward movement opposite a direction of a capsule insertion while the capsule is maintained in the brewing position fixed with respect to the frame after the completion of the brewing cycle prior to the opening of the brewing chamber, and wherein during the upward movement the capsule supporting member is configured to deform the capsule portion after the completion of the brewing cycle prior to the opening of the brewing chamber.

11. The brewing device according to claim 10, wherein after the upward movement, the capsule supporting member is configured to be positioned above the capsule portion engaged by the capsule supporting member during the supporting position, and wherein the capsule is no longer supported by the supporting member in the releasing position after the completion of the brewing cycle prior to the opening of the brewing chamber.

12. The brewing device according to claim 1, wherein the pair of opposed guiding channels and the capsule supporting member are integral to one another.

13. The brewing device according to claim 1, wherein the capsule supporting member includes a projection arranged inside each of the pair of opposed guiding channels, a distance between the projections being less than a maximum diameter of a capsule flange.

14. The brewing device according to claim 1, wherein the pair of opposed guiding channels and the capsule supporting member are provided on a positioning member, the positioning member being configured to move in a direction substantially orthogonal to a direction of a motion of the first chamber and the second chamber, and wherein the positioning member is configured to move upwardly in a direction towards the insertion area to disengage the capsule from the capsule supporting member prior to the opening of the brewing chamber while the brewing chamber is in the closed position after the completion of the brewing cycle.

15. The brewing device according to claim 14, wherein a control device is configured to control movements of the first chamber, the second chamber and the positioning member during the brewing cycle, the movements being:
when the capsule is in the brewing position the first chamber and the second chamber are moved towards each other and towards the capsule to approach the closed position and close the brewing chamber, the capsule being maintained in the brewing position fixed with respect to the frame;
after the completion of the brewing cycle prior to the opening of the brewing chamber, the positioning member, including the capsule supporting member, is configured to be lifted upwardly opposite a capsule insertion direction to disengage the capsule from the capsule supporting member, while the brewing chamber is maintained in the closed position, the capsule being maintained in the brewing position fixed with respect to the frame; and
once the capsule supporting member has been lifted and disengages the capsule, the brewing chamber is opened to the open position by moving the first chamber and the second chamber apart and the capsule is released from the brewing position.

16. The brewing device of claim 1, further comprising a pair of elongated slides constrained to slide along the frame,
wherein each of the pair of elongated sides comprises a first cam and a second cam,
wherein the first cam is configured to slidingly interact with a pin to reversibly move the capsule supporting member between the supporting position and the releasing position,
wherein the second cam is configured to slidingly interact with a pushing appendix to move a lever for moving the first and second chambers between the closed position and the open position,
wherein each of the pair of elongated slides is configured to slidingly interact with the pin and the pushing appendix to disengage the capsule from the supporting position and to release the capsule into the releasing position after a completion of a brewing cycle prior to opening the brewing chamber, and wherein each of the pair of elongated slides is configured to slidingly interact with the pin and the pushing appendix of each of the pair of elongated slides to deform the capsule portion engaged by the capsule supporting member during the supporting position for allowing the disengaging of the capsule from the capsule supporting member after the completion of the brewing cycle prior to the opening of the brewing chamber.

17. The brewing device of claim 16, wherein during movement of the lever for disengaging of the capsule from the capsule supporting member after the completion of the brewing cycle prior to the opening of the brewing chamber, the pushing appendix is configured to slide in each of the pair of elongated slides to cause a retraction of the pair of elongated slides, and wherein the retraction of the pair of elongated slides causes the pin of each of the pair of elongated slides to slidingly interact with the first cam of each of the pair of elongated slides to cause the capsule supporting member to deform the capsule portion and to disengage the capsule from the supporting position into the releasing position after the completion of the brewing cycle prior to the opening of the brewing chamber.

18. The brewing device of claim 17, wherein the movement of the lever for disengaging of the capsule from the capsule supporting member after the completion of the brewing cycle prior to the opening of the brewing chamber is a rotation of the lever to a predetermined angle less than a complete rotation of the lever that moves the brewing chamber to the open position.

19. The brewing device of claim 1, wherein the capsule is maintained in the brewing position fixed with respect to the frame and supported by the capsule supporting member, when the first chamber and the second chamber move towards the closed position, and
 wherein the capsule supporting member is configured to reversibly move between the supporting position to support the capsule in the brewing position and the releasing position to disengage the capsule from the capsule supporting member after the completion of the brewing cycle prior to the opening of the brewing chamber.

20. A machine for producing food products by an extraction from a capsule, the machine having a brewing device, the brewing device comprising:
 a frame having an insertion area for the capsule, the capsule being insertable in the insertion area towards a brewing position fixed with respect to the frame, wherein the frame comprises two side walls, each side wall comprising a longitudinal guide disposed in the side wall;
 a brewing chamber comprising a first chamber and a second chamber movably arranged in the frame, the first and second chambers being movable both one with respect to the other and with respect to the frame between a closed position and an open position,
  wherein the first chamber and the second chamber are configured to move different distances with respect to each other and with respect to the frame, when the first chamber and the second chamber move between the closed position and the open position, the first chamber being configured to move a first distance by a first pair of cursors slidingly arranged in the longitudinal guides and the second chamber being configured to move a second distance by a second pair of cursors slidingly arranged in the longitudinal guides, wherein the first distance is different from the second distance;
 ducts configured to supply a brewing fluid to the brewing chamber and to dispense a brewed product from the brewing chamber;
 a pair of opposed guiding channels configured to guide the capsule towards the brewing position fixed with respect to the frame, when the capsule is inserted in the insertion area; and
 a capsule supporting member in the pair of opposed guiding channels configured to support the capsule in the brewing position fixed with respect to the frame by engaging a capsule portion during a supporting position of the capsule supporting member,
  wherein the capsule supporting member is further configured to disengage the capsule from the supporting position and to release the capsule into a releasing position, disengaged from the capsule supporting member, after a completion of a brewing cycle prior to opening the brewing chamber by deforming the capsule portion after the completion of the brewing cycle prior to the opening of the brewing chamber.

21. The machine of claim 20, further comprising a pair of elongated slides constrained to slide along the frame,
 wherein each of the pair of elongated sides comprises a first cam and a second cam,
 wherein the first cam is configured to slidingly interact with a pin to reversibly move the capsule supporting member between the supporting position and the releasing position,
 wherein the second cam is configured to slidingly interact with a pushing appendix to move a lever for moving the first and second chambers between the closed position and the open position,
 wherein each of the pair of elongated slides is configured to slidingly interact with the pin and the pushing appendix to disengage the capsule from the supporting position and to release the capsule into the releasing position after a completion of a brewing cycle prior to opening the brewing chamber, and
 wherein each of the pair of elongated slides is configured to slidingly interact with the pin and the pushing appendix of each of the pair of elongated slides to deform the capsule engaged by the capsule supporting member during the supporting position for allowing the disengaging of the capsule from the capsule supporting member after the completion of the brewing cycle prior to the opening of the brewing chamber.

22. The machine of claim 21, wherein during movement of the lever for disengaging of the capsule from the capsule supporting member after the completion of the brewing cycle prior to the opening of the brewing chamber, the pushing appendix is configured to slide in each of the pair of elongated slides to cause a retraction of the pair of elongated slides, and wherein the retraction of the pair of elongated slides causes the pin of each of the pair of elongated slides to slidingly interact with the first cam of each of the pair of elongated slides to cause the capsule supporting member to deform the capsule portion and to disengage the capsule from the supporting position into the releasing position after the completion of the brewing cycle prior to the opening of the brewing chamber.

23. The machine of claim 22, wherein the movement of the lever for disengaging of the capsule from the capsule supporting member after the completion of the brewing cycle prior to the opening of the brewing chamber is a rotation of the lever to a predetermined angle less than a complete rotation of the lever that moves the brewing chamber to the open position.

24. The machine of claim 20, wherein the capsule is maintained in the brewing position fixed with respect to the frame and supported by the capsule supporting member, when the first chamber and the second chamber move towards the closed position, and
   wherein the capsule supporting member is configured to reversibly move between the supporting position to support the capsule in the brewing position and the releasing position to disengage the capsule from the capsule supporting member after the completion of the brewing cycle prior to the opening of the brewing chamber.

* * * * *